(12) United States Patent
Malek et al.

(10) Patent No.: US 8,383,242 B2
(45) Date of Patent: Feb. 26, 2013

(54) LIGHTWEIGHT COMPONENT OF HYBRID

(75) Inventors: Thomas Malek, Pulheim (DE); Julian Haspel, Köln (DE); Ulrich Dajek, Leverkusen (DE); Ralf Zimnol, Overath (DE); Guenter Margraf, Limeshain (DE)

(73) Assignee: Lanxess Deutschland GmbH, Leverkusen (DE)

( * ) Notice: Subject to any disclaimer, the term of this patent is extended or adjusted under 35 U.S.C. 154(b) by 707 days.

(21) Appl. No.: 12/617,927

(22) Filed: Nov. 13, 2009

(65) Prior Publication Data

US 2010/0173126 A1    Jul. 8, 2010

(30) Foreign Application Priority Data

Nov. 19, 2008    (DE) .................. 10 2008 058 225

(51) Int. Cl.
*B32B 15/08*    (2006.01)
(52) U.S. Cl. .............. 428/458; 296/203.03; 296/203.01; 29/897.2; 264/274; 114/355; 114/356; 114/357
(58) Field of Classification Search .................. 428/458; 296/203.03, 203.01; 29/897.2; 264/274; 114/355, 356, 357
See application file for complete search history.

(56) References Cited

U.S. PATENT DOCUMENTS

| | | | |
|---|---|---|---|
| 3,644,574 A | 2/1972 | Jackson et al. | |
| 4,713,415 A | 12/1987 | Lavengood et al. | |
| 4,806,593 A | 2/1989 | Kress et al. | |
| 4,812,515 A | 3/1989 | Kress et al. | |
| 4,859,740 A | 8/1989 | Damrath et al. | |
| 4,861,831 A | 8/1989 | Damrath et al. | |
| 4,937,285 A | 6/1990 | Wittmann et al. | |
| 5,756,576 A | 5/1998 | Bruls et al. | |
| 6,538,024 B1 | 3/2003 | MacDonald et al. | |
| 6,688,680 B1 | 2/2004 | Cooper et al. | |
| 6,761,187 B1 | 7/2004 | Zoellner | |
| 2003/0159261 A1* | 8/2003 | Kappenstein et al. ......... 29/17.1 |

FOREIGN PATENT DOCUMENTS

| | | |
|---|---|---|
| CA | 210 9024 A1 | 4/1994 |
| DE | 2 035 390 A1 | 1/1971 |
| DE | 2 248 242 A1 | 4/1973 |
| DE | 27 50 982 A1 | 5/1979 |
| DE | 3 631 539 A1 | 3/1988 |
| DE | 3 631 540 A1 | 3/1988 |
| DE | 3 704 655 A1 | 8/1988 |
| DE | 3 704 657 A1 | 8/1988 |
| DE | 4 236 122 A1 | 4/1994 |
| DE | 100 18 186 B4 | 10/2001 |
| DE | 100 53 840 A1 | 5/2002 |
| DE | 101 38 216 A1 | 2/2003 |
| DE | 101 47 712 A1 | 4/2003 |

(Continued)

OTHER PUBLICATIONS

Ulmann, Enzyklopädie d. Techn. Chemie, p. 280-295, (1980).

(Continued)

*Primary Examiner* — Michael C Miggins
(74) *Attorney, Agent, or Firm* — Norris McLaughlin & Marcus PA

(57) ABSTRACT

The present invention relates to lightweight components of hybrid design, also termed hybrid component or hollow-chamber lightweight component, composed of a parent body which is composed of galvanized iron and which is reinforced by means of thermoplastics and is suitable for the transmission of high mechanical loads.

12 Claims, 13 Drawing Sheets

FOREIGN PATENT DOCUMENTS

| | | |
|---|---|---|
| DE | 101 50 061 A1 | 5/2003 |
| DE | 101 63 163 A1 | 7/2003 |
| DE | 102 21 709 A1 | 3/2004 |
| DE | 699 09 629 T2 | 4/2004 |
| EP | 0 202 214 A2 | 11/1986 |
| EP | 0 370 342 A2 | 5/1990 |
| EP | 0 679 565 B1 | 11/1995 |
| EP | 0 785 234 A1 | 7/1997 |
| EP | 1 032 526 B1 | 9/2000 |
| EP | 1 211 164 B1 | 6/2002 |
| EP | 1 223 032 A2 | 7/2002 |
| EP | 1 232 935 A1 | 8/2002 |
| EP | 1 294 552 B1 | 3/2003 |
| EP | 1 380 493 A2 | 1/2004 |
| EP | 1 559 541 A1 | 8/2005 |
| EP | 1 958 763 A1 | 8/2008 |
| GB | 1 409 275 A | 10/1975 |
| WO | 98/11164 A1 | 3/1998 |
| WO | 98/17720 A1 | 4/1998 |
| WO | 01/38063 A1 | 5/2001 |
| WO | 01/40009 A1 | 6/2001 |
| WO | 02/068257 A1 | 9/2002 |
| WO | 2004/011315 A1 | 2/2004 |
| WO | 2004 071741 A1 | 8/2004 |
| WO | 2004/071741 A1 | 8/2004 |

OTHER PUBLICATIONS

Chemistry A European Journal, vol. 6, No. 1, pp. 2-9, (2000).
H. Frey et al., "Degree of Branching in Hyperbranched polymers", Acta Polymer, vol. 48. pp. 30-35 (1997).
H. Frey et al., "Controlling the Growth of Polymer Trees: Concepts and Perspectives for Hyperbranched Polymers" Chem. Eur. J. 2000, vol. 6., No. 14, pp. 2499-2506, (2000).
Joining Plastics p. 210-216 (2008).
Paul J. Flory, "Molecular size Distribution in Three Dimensional Polymers. VI. Branched Polymers Containing A-R-B, Type Units", Department of Chemistry of Cornell University, vol. 74, pp. 2718-2723, Jun. 25, 1952.

\* cited by examiner

LIGHTWEIGHT COMPONENT OF HYBRID

The present invention relates to lightweight components of hybrid design, also termed hybrid component or hollow-chamber lightweight component, composed of a parent body which is composed of galvanized iron and which is reinforced by means of thermoplastics and is suitable for the transmission of high mechanical loads, where particular flow aids are added to the thermoplastic in order to improve its physical properties.

These lightweight components of appropriate design are used for vehicle parts, or in load-bearing elements of office machinery, or household machinery or other machinery, or in design elements for decorative purposes or the like.

BACKGROUND OF THE INVENTION

A feature of lightweight components of hybrid design, hereinafter also termed hybrid components, is interlock connectioning of a parent body mostly composed of metal, or of a hollow body which is, if appropriate, of shell type, to a plastics part joined onto or introduced into the same. For the purposes of the present invention, they are also termed lightweight components, and in the case of shell-type components are also termed hollow-chamber lightweight components.

German Offenlegungsschrift 27 50 982 discloses a non-releasable connection involving two or more parts, preferably composed of metal, where the connection is composed of plastic and is produced in a mould which receives the parts to be connected, for example by the injection-moulding process. EP-A 0 370 342 discloses a lightweight component of hybrid design composed of a shell-type parent body, the interior of which has reinforcing ribs securely connected to the parent body, in that the reinforcing ribs are composed of moulded-on plastic and their connection to the parent body is achieved at discrete connection sites by way of perforations in the parent body, where the plastic extends through these and across the area of the perforations, achieving a secure interlock connection. WO 2002/068257 A1 discloses "integrated structures" composed of metal and plastic, describing a large number of means for connecting the two components securely to one another. WO 2004/071741 A1 discloses the alternative procedure, namely using two operations first to mould the plastic onto the shell-type metal part in such a way that the plastic passes through openings in the metal part and leaves flash material on the other side, with an additional conversion operation then required before this material leads to a secure interlock connection. EP 1 294 552 B1 discloses that, for the production of a hybrid component, it is possible that the metal core has been not completely, but only sectionally, overmoulded by the plastic, to give a secure interlock connection. WO 2004/011315 A1 describes a further variant, in which the metal part provides, both above and below, openings for the secure interlock connection with the overmoulded plastic. WO 2001/38063 A1 describes a composite plastics part composed of at least two sheet-like workpieces of different material, for example plastic and metal, or of different metals or plastics, where the workpieces have been connected to one another in their peripheral region, and the connection is composed of moulded-on thermoplastic. EP 1 223 032 A2 discloses a sheet-type lightweight component of hybrid design. U.S. Pat. No. 6,761,187 B1 discloses a hybrid component in the form of a channel or of a tube with integrated closure composed of a thermoplastic.

It was quickly recognized that lightweight components of hybrid design have excellent suitability wherever high stability, high energy absorption in the event of a crash, and weight saving are important, i.e. in the construction of motor vehicles, for example. EP 0 679 565 B1 discloses the front end of a motor vehicle with at least one rigid transverse bar which extends over most of the length of the front end, with at least one support part which is composed of plastic and which is cast onto the end region of the rigid transverse bar. EP 1 032 526 B1 discloses a load-bearing structure for the front module of a motor vehicle composed of a steel sheet parent body, of an unreinforced amorphous thermoplastic material, of a glass-fibre-reinforced thermoplastic, and also of a rib structure composed of, for example, polyamide. DE 100 53 840 A1 discloses a bumper system or energy-absorber element composed of oppositely arranged metal sheets and connection ribs composed of thermoplastic or thermoset. WO 2001/40009 A1 discloses the use of hybrid technology in brake pedals, clutch pedals or accelerator pedals of motor vehicles. EP 1 211 164 B1 in turn describes the support structure for a motor vehicle radiator arrangement, using a hybrid structure. DE 101 50 061 A1 discloses the upper transverse member in the vehicle front module of hybrid design. U.S. Pat. No. 6,688,680 B1 describes a transverse member of hybrid design in a motor vehicle. EP 1 380 493 A2 gives another example of a front end panel of a motor vehicle, but here the material is not injected around all of the metal part but takes the form of webs bracketing the same. Lightweight components of hybrid design can be used not only for front ends or pedals but also anywhere in the bodywork of a vehicle. Examples of this are provided by DE 100 18 186 B4 for a vehicle door with door casing, EP 1 232 935 A1 for the actual bodywork of a vehicle, and DE 102 21 709 A1 for the load-bearing elements of motor vehicles.

High-flowability thermoplastic compositions are of interest for a wide variety of shaping processes, such as injection-moulding applications. By way of example, thin-walled components in the electrical and electronics industries and in the motor vehicle industry demand low viscosities of the thermoplastic composition, to permit filling of the mould while using minimum filling pressures or clamping forces for the corresponding injection-moulding machinery. This is also relevant to the simultaneous charging of a plurality of injection-moulded components by way of a shared gating system in what are known as multi-cavity moulds. Furthermore, low-viscosity thermoplastic compositions can also often achieve shorter cycle times. Good flowabilities are also specifically very important in the case of highly filled thermoplastic compositions, for example those with glass-fibre content and/or mineral content above 40% by weight.

However, it has now become apparent that the secure metal-plastic composite in the abovementioned applications is primarily achieved via the perforations in the metal and the thermoplastic flowing through the perforations. Disadvantages of this are firstly that additional amounts of thermoplastic are required, thus increasing weight, and that the secure interlock connection is present primarily at the perforations unless additional webs according to EP-A 13 80 493 are provided. A considerable portion of the metal surface is therefore not available at all for secure interlock connection of metal to plastic.

SUMMARY OF THE INVENTION

The object of the present invention therefore consisted in producing hollow-chamber lightweight components of hybrid design which firstly have the advantages known from the prior art, e.g. high buckling resistance, high torsional stability, relatively high strength, relatively low weight, and relatively low mould temperatures during production, but where the metal-plastic composite is not achieved by way of individual perforations of, or webs around, the metal, but instead involves the entire contact surface of the geometry of the plastic on the metal surface.

The object is achieved, and the present invention therefore provides, lightweight components composed of a parent body composed of galvanized iron and having reinforcing structures, where the reinforcing structures have been securely connected to the parent body and are composed of moulded-on thermoplastic, characterized in that the thermoplastic polymer moulding compositions used comprise polyamide moulding compositions which comprise from 99.99 to 10 parts by weight, preferably from 99.5 to 40 parts by weight, particularly preferably from 99.0 to 55 parts by weight, of at least one aliphatic, semicrystalline, thermoplastic polyamide, and in that the galvanized iron has been pretreated by a process from the group of acid treatment, soda treatment, amine treatment, anodic treatment, base treatment or laser treatment.

DETAILED DESCRIPTION OF THE INVENTION

For clarification, it should be noted that the scope of the invention encompasses any desired combination of all of the definitions and parameters listed above in general terms or in preferred ranges.

Polyamides to be used with preference are nylon-6 (PA 6) and nylon-6,6 (PA 66) with relative solution viscosities of from 2.0 to 4.0 (measured in m-cresol at 25° C.), and particularly preferably nylon-6 with relative solution viscosity of from 2.3 to 2.6 (measured in m-cresol at 25° C.), or a mixture composed of A) from 99.99 to 10 parts by weight, preferably from 99.5 to 40 parts by weight, particularly preferably from 99.0 to 55 parts by weight, of polyamide and with at least one component B) from 0.01 to 50 parts by weight, preferably from 0.25 to 20 parts by weight, particularly preferably from 1.0 to 15 parts by weight, of an additional flow improver from the group of B1) a copolymer composed of at least one olefin, preferably an α-olefin, with at least one methacrylate or acrylate of an aliphatic alcohol, preferably of an aliphatic alcohol having from 1 to 30 carbon atoms, with MFI of not less than 100 g/10 min, the MFI (melt flow index) being measured or determined at 190° C. using a test weight of 2.16 kg, or B2) a highly branched or hyperbranched polycarbonate with an OH number of from 1 to 600 mg KOH/g of polycarbonate (to DIN 53240, Part 2), or B3) a highly branched or hyperbranched polyester of $A_xB_y$ type, where x is at least 1.1 and y is at least 2.1, or B4) a polyalkylene glycol ester (PAGE) with low molecular weight of the general formula (I)

R—COO—(Z—O)$_n$OC—R    (I)

in which

R is a branched or straight-chain alkyl group having from 1 to 20 carbon atoms,

Z is a branched or straight-chain $C_2$ to $C_{15}$ alkylene group, and n is a whole number from 2 to 20, or a mixture of B1) with B2) or of B2) with B3) or of B1) with B3) or of B1) with B2) and with B3) or of B1) with B4) or of B2) with B4) or of B3) with B4) or a ternary mixture of components B1) to B4), in each case with A), where the secure interlock connection between parent body and thermoplastic is achieved by way of the galvanized iron surface of the parent body.

However, according to the invention, the term polyamide also encompasses polyamides which contain macromolecular chains having a star-shaped structure and which contain linear macromolecular chains. These polyamides, the structure of which provides improved flow, are obtained according to DE 699 09 629 T2 by polymerising a mixture of monomers, where the mixture encompasses at least a) monomers of the general formula (II) $R_1\text{-}(\text{-}A\text{-}Z)_m$, b) monomers of the formula (IIIa) X—$R_2$—Y and (IIIb) $R_2$—NH—C=O, 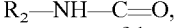

c) monomers of the general formula (IV) Z—$R_3$—Z, in which $R_1$ is a linear or cyclic, aromatic or aliphatic hydrocarbon radical which contains at least two carbon atoms and which can contain heteroatoms, A is a covalent bond or an aliphatic hydrocarbon radical having from 1 to 6 carbon atoms, Z is a primary amine radical or a carboxy group, $R_2$ and $R_3$ are identical or different, being aliphatic, cycloaliphatic or aromatic, substituted or unsubstituted hydrocarbon radicals which contain from 2 to 20 carbon atoms and which can contain heteroatoms, and Y is a primary amine radical, if X is a carbonyl radical, or Y is a carbonyl radical, if X is a primary amine radical, where m is a whole number from 3 to 8.

The molar concentration of the monomers of the formula (II) in the monomer mixture is from 0.1% to 2%, that of the monomers of the formula (IV) is from 0.1% to 2%, and the balance here making up 100% corresponds to the monomers of the general formulae (IIIa) and (IIIb). These polyamides may be used independent from using component B) as these polyamides show already enhanced fluidity because of their star-shaped structure.

Galvanized iron is produced by using zinc to coat iron structures or iron sheets, in order to protect them from rust. The iron articles or steel articles here are pickled using dilute sulphuric acid comprising some tar or tin salt and copper sulphate, and are sand-blasted and immersed in ammonium chloride solution, dried in a heated chamber and are then, while still hot, immersed in zinc which has been heated to well above its melting point, and which has a covering of ammonium chloride to prevent oxidation.

The galvanized articles are placed in water, abraided with a brush, and dried in sawdust. Relatively small articles are immersed in large numbers in the molten zinc and removed after one minute using a perforated ladle, and heated to red heat under wood-charcoal powder in a reverberatory furnace, until excess zinc has been removed by melting.

In galvanized iron, the zinc is positive and is the only material oxidized, while even the exposed iron remains uncorroded. The protective effect of the zinc extends to distances of from 4 to 6 mm in air, and much further under water. The galvanizing process is very widely used because of the said advantages, and particular apparatuses are used to permit convenient handling of the metal sheet and wire. The zinc is melted in iron troughs which have an internal lining of clay, or in masonry basins, and the component to be galvanized is placed in the molten metal or is passed through the bath at an appropriate speed.

Sheet-metal parts preferred according to the invention comprise from 45 to 300 g of zinc for each square meter of area, and the strength of the zinc layer can therefore be assumed to be from 0.006 to 0.043 mm.

Iron is sometimes first electrogalvanized, to provide more secure adhesion of the molten zinc. Another method adequate for this purpose places the pickled and sand-blasted articles in a zinc chloride solution comprising ammonium chloride in a zinc box, and removes them after two minutes, dries them on a metal sheet heated from below, and immediately immerses them in the molten zinc.

According to the invention, the galvanized parent bodies to be used according to the invention, composed of steel or of iron, are subjected to a further surface treatment, in order to achieve a secure interlock connection between parent body and thermoplastic. For the purposes of the present invention, it has specifically been found that a secure interlock connection is not achieved simply by galvanizing the iron parent body or steel parent body. Pretreatment of the galvanized iron/steel parent body is required according to the invention and can in principle be achieved by various processes. Pretreatment processes according to the invention from the group of acid treatment, soda treatment, amine treatment, anodic treatment, base treatment or laser treatment are used here. In one preferred embodiment of the present invention, other surface modifications can additionally be used to increase the zinc surface area prepared by the types of treatment mentioned. One preferred embodiment here uses graduated adhesion-promoter layers (plastic-metal) which are applied by thermal spraying, and which provide a different method of increasing adhesion.

EP 1 958 763 A1 or EP 1 559 541 A1, the entire content of which is incorporated by way of reference into the present invention, give examples of the abovementioned pretreatment methods that are preferred according to the invention. Accordingly, for the acid treatment it is preferable to use inorganic acids, and particularly preferably aqueous solutions of the said inorganic acids, in particular hydrochloric acid, sulphuric acid, nitric acid, or an aqueous solution of ammonium hydrogen fluoride.

For the soda treatment it is preferable to use caustic soda (NaOH).

For the amine treatment, it is preferable to use ammonia, hydrazine or the aqueous solution of an organic amine. For the purposes of the present invention, preferred organic amines are amines from the group of methylamine, dimethylamine, trimethylamine, ethylamine, diethylamine, triethylamine, ethylenediamine, ethanolamine, allylamine, ethanolamine, diethanolamine, triethanolamine, aniline and the like.

For the anodic treatment, the galvanized iron/steel part or the galvanized iron parent body is first prepared so as to remove oils or fats, and then is subjected to alkali treatment, and finally is electrolytically coated by an oxide layer in an anodic process, in an acidic aqueous solution. It is preferable that the alkali treatment uses an aqueous solution of caustic soda, at a concentration of from 10 to 20%, at from 50 to 90 degrees Celsius, followed by chemical polishing. In this process, the galvanized component is immersed for a few seconds in a highly concentrated aqueous solution of an inorganic acid, preferably nitric acid, phosphoric acid, or sulphuric acid, or the like, at from 80 to 100 degrees Celsius.

For the alkali treatment process, it is preferable to use aqueous solutions of alkali metal hydroxides or of alkaline earth metal hydroxides or sodium carbonate or potassium carbonate. Particularly preferred hydroxides are hydroxides from the group of sodium hydroxide, potassium hydroxide, calcium hydroxide, strontium hydroxide, barium hydroxide, or radium hydroxide.

For the laser treatment, pulsed Nd:YAG laser radiation is used if appropriate in combination with a galvanometric scan system. This method can apply various structures to the zinc surface of the iron parent body. Preferred structures are a point structure with a structural density of 0.15, a linear structure with a structural density of 0.31, or a cross structure with a structural density of 0.53. The width of the structures is preferably 20 micrometers. The depth of the structures is preferably 30 micrometers. The separation is preferably 100 micrometers. (Joining Plastics, 3/08 pages 210-217).

For the purposes of the present invention, galvanized iron therefore always means galvanized parent bodies composed of iron or steel which have additionally been subjected to a surface treatment, where a pretreatment from the group of acid treatment, soda treatment, amine treatment, anodic treatment, base treatment, or laser treatment has been carried out.

In one preferred embodiment, the secure interlock connection between moulded-on thermoplastic and the parent body composed of galvanized iron can also be achieved by way of discrete connection sites, specifically by way of perforations in the parent body, where the thermoplastic passes through these perforations and extends over the area of the perforations, thus additionally reinforcing the secure interlock connection which is in any case already being achieved by way of the galvanized surface of the iron parent body.

The moulding-on of the thermoplastic is then preferably achieved in one operation. In the event that the parent body additionally still has perforations that require overmoulding, the procedure for the moulding-on and overmoulding of the thermoplastic can be carried out in one, two, or three or more steps, as also can the forming process carried out on the flash material on the opposite side, to give a plug.

The parent body composed of galvanized iron preferably has a shell-type shape, particularly preferably a U shape, in order to accept reinforcing structures, such as reinforcing ribs composed of thermoplastic. The parent body composed of galvanized iron can also have a different shape, in the case of vehicle doors or of the alternative components listed at a later stage below for a motor vehicle. The three-dimensional shape of the parent body composed of galvanized iron is in essence determined via the shape of the moulding to be produced.

The method of processing of the thermoplastic when it is used in the production of lightweight components of hybrid design according to the invention involves known shaping processes, preferably injection moulding, melt extrusion, compression moulding, stamping or blow moulding.

According to the invention, polyamide is used as thermoplastic or component A) in the moulding compositions to be processed. Polyamides preferred according to the invention are described by way of example in Kunststoff-Taschenbuch [Plastics Handbook] (Ed. Saechtling), 1989 edition, which also mentions sources. The person skilled in the art is aware of processes for the production of these polyamides. The effects to be achieved are apparent with all of the variations known in the prior art cited above for the use of hybrid technology, irrespective of whether the thermoplastic is securely connected only in part or across its entire surface to the galvanized iron parent body, or, as in the case of EP 1 380 493 A2, merely forms a web surrounding the same, and irrespective of whether the thermoplastic is additionally held in place by adhesive bonding or is connected to the galvanized iron parent body by, for example, a laser, or, as in WO 2004/071741, an additional operation is used to obtain secure interlock connection of plastics part and metal part.

Preferred polyamides to be used as component A) are nylon-6 (PA 6) or nylon-6,6 (PA 66), or blends comprising primarily polyamide.

Polyamides to be used with particular preference according to the invention as component A) are semicrystalline polyamides which can be produced starting from diamines and dicarboxylic acids and/or from lactams having at least 5 ring members or from corresponding amino acids. Starting materials that can be used for this purpose are aliphatic and/or aromatic dicarboxylic acids, e.g. adipic acid, 2,2,4- and 2,4,4-trimethyladipic acid, azelaic acid, sebacic acid, isophthalic acid, terephthalic acid, aliphatic and/or aromatic diamines, e.g. tetramethylenediamine, hexamethylenediamine, 1,9-nonanediamine, 2,2,4- and 2,4,4-trimethylhexamethylenediamine, the isomeric diaminodicyclohexylmethanes, diaminodicyclohexylpropanes, bisaminomethylcyclo-hexane, phenylenediamines, xylylenediamines, aminocarboxylic acids, e.g. aminocaproic acid, or the corresponding lactams. Copolyamides composed of a plurality of the monomers mentioned are included.

Polyamides preferred according to the invention are those produced from caprolactams, very particularly preferably from ε-caprolactam, and most of the compounded materials based on PA 6, on PA 66, and on other aliphatic and/or aromatic polyamides or the corresponding copolyamides, where these have from 3 to 11 methylene groups for each polyamide group in the polymer chain.

Semicrystalline polyamides to be used according to the invention as component A) can also be used in a mixture with other polyamides and/or with further polymers. It is also possible, therefore, to use polyamides which accord with DE 699 09 629 T2 in that the percentage by number of macromolecular chains of star type present is from 50% to 90%.

Conventional additives can be admixed in the melt of the polyamides, or applied to the surface, examples being mould-release agents, stabilizers and/or flow aids.

In one alternative embodiment, however, it is also possible to use recycled PA materials, if appropriate in a mixture with polyalkylene terephthalates, such as polybutylene terephtalates (PBT).

According to the invention, the term recyclates encompasses
1) "post-industrial recyclates", which are production wastes arising during the polycondensation reaction or sprues arising during processing by injection moulding, start-up products from injection moulding or extrusion, or edge cuts of extruded sheets or foils, and
2) "post-consumer recyclates", which are plastics items collected by the final consumer after use, and treated.

Both types of recyclate can be used either in the form of regrind or in the form of pellets. In the latter case, the crude recyclates are melted in an extruder, after separation and purification, and pelletized. This mostly facilitates handling and free flow, and metering for further steps of processing.

It is possible to use either pelletized recyclates or those in the form of regrind, but the maximum edge length here should be 10 mm, preferably below 8 mm.

If the intention is that flow improver is also to be added to the polyamide, the moulding compositions to be used according to the invention can comprise at least one component B), where the component B) used can comprise flow improvers from the group of B1) and/or B2) and/or B3) and/or B4).

According to the invention, B1) is copolymers, preferably random copolymers, composed of at least one olefin, preferably α-olefin, and of at least one methacrylate or acrylate of an aliphatic alcohol. In one preferred embodiment, these are random copolymers composed of at least one olefin, preferably α-olefin, and of at least one methacrylate or acrylate with MFI of no less than 100 g/10 min, preferably no less than 150 g/10 min, particularly preferably no less than 300 g/10 min, where, for the purposes of the present invention, the MFI (Melt Flow Index) was measured or determined uniformly at 190° C. with a test weight of 2.16 kg. The upper MFI limit is around 900 g/10 min.

In one particularly preferred embodiment, the copolymer B1) is composed of less than 4% by weight, particularly preferably less than 1.5% by weight and very particularly preferably 0% by weight, of monomer units which contain further reactive functional groups selected from the group consisting of epoxides, oxetanes, anhydrides, imides, aziridines, furans, acids, amines and oxazolines.

Olefins, preferably α-olefins, suitable as constituent of the copolymers B1) preferably have from 2 to 10 carbon atoms and can be unsubstituted or can have substitution by one or more aliphatic, cycloaliphatic or aromatic groups.

Preferred olefins are those selected from the group consisting of ethene, propene, 1-butene, 1-pentene, 1-hexene, 1-octene, 3-methyl-1-pentene. Particularly preferred olefins are ethene and propene, and ethene is particularly preferred.

Mixtures of the olefins described are also suitable.

In an embodiment to which further preference is given, the further reactive functional groups of the copolymer B1), selected from the group consisting of epoxides, oxetanes, anhydrides, imides, aziridines, furans, acids, amines, oxazolines, are introduced exclusively by way of the olefins into the copolymer B1).

The content of the olefin in the copolymer B1) is from 50 to 90% by weight, preferably from 55 to 75% by weight.

The copolymer B1) is further defined via the second constituent alongside the olefin. A suitable second constituent is alkyl esters or arylalkyl esters of acrylic acid or methacrylic acid whose alkyl or arylalkyl group is formed from 1 to 30 carbon atoms. The alkyl or arylalkyl group here can be linear or branched, and also can contain cycloaliphatic or aromatic groups, and alongside this can also have substitution by one or more ether or thioether functions. Other suitable methacrylates or acrylates in this connection are those synthesized from an alcohol component based on oligoethylene glycol or on oligopropylene glycol having only one hydroxy group and at most 30 carbon atoms.

By way of example, the alkyl group or arylalkyl group of the methacrylate or acrylate can have been selected from the group consisting of methyl, ethyl, n-propyl, isopropyl, n-butyl, isobutyl, tert-butyl, sec-butyl, 1-pentyl, 1-hexyl, 2-hexyl, 3-hexyl, 1-heptyl, 3-heptyl, 1-octyl, 1-(2-ethyl)hexyl, 1-nonyl, 1-decyl, 1-dodecyl, 1-lauryl or 1-octadecyl. Preference is given to alkyl groups or arylalkyl groups having from 6 to 20 carbon atoms. Preference is particularly also given to branched alkyl groups which have the same number of carbon atoms as linear alkyl groups but give a lower glass transition temperature $T_G$.

According to the invention, an aryl group is a molecular moiety based on an aromatic skeleton, preferably being a phenyl radical.

Particular preference according to the invention is given to copolymers B1) in which the olefin is copolymerized with 2-ethylhexyl acrylate. Mixtures of the acrylates or methacylates described are also suitable.

It is preferable here to use more than 60% by weight, particularly preferably more than 90% by weight and very particularly preferably 100% by weight, of 2-ethylhexyl acrylate, based on the total amount of acrylate and methacrylate in copolymer B1).

In an embodiment to which further preference is given, the further reactive functional groups selected from the group consisting of epoxides, oxetanes, anhydrides, imides, aziridines, furans, acids, amines, oxazolines in the copolymer B1) are introduced exclusively by way of the acrylate or methacrylate into the copolymer B1).

The content of the acrylate or methacrylate in the copolymer B1) is from 10 to 50% by weight, preferably from 25 to 45% by weight.

A feature of suitable copolymers B1) is not only their constitution but also their low molecular weight, their MFI value (Melt Flow Index) measured at 190° C. with a load of 2.16 kg being at least 100 g/10 min, preferably at least 150 g/10 min, particularly preferably at least 300 g/10 min The upper MFI limit is around 900 g/10 min.

Copolymers particularly suitable as component B1) are those selected from the group of the materials supplied by Atofina with trade mark Lotryl® EH, these usually being used as hot-melt adhesives.

The moulding compositions according to the invention can comprise, as component B), as an alternative to B1) or in addition to B1), from 0.01 to 50% by weight, preferably from 0.5 to 20% by weight and in particular from 0.7 to 10% by weight, of B2) at least one highly branched or hyperbranched polycarbonate with an OH number of from 1 to 600 mg KOH/g of polycarbonate, preferably from 10 to 550 mg KOH/g of polycarbonate and in particular from 50 to 550 mg KOH/g of polycarbonate (to DIN 53240, Part 2) or of at least one hyperbranched polyester as component B3) or a mixture of B1) with B2) or of B2) with B3) or of B1) with B3) or a mixture of B1) with B2) and with B3).

For the purposes of this invention, hyperbranched polycarbonates B2) are non-crosslinked macromolecules having hydroxy groups and carbonate groups, these having both structural and molecular non-uniformity. Their structure may firstly be based on a central molecule in the same way as dendrimers, but with non-uniform chain length of the branches. Secondly, they may also have a linear structure with functional pendant groups, or else they may combine the two extremes, having linear and branched molecular portions. See also P. J. Flory, J. Am. Chem. Soc. 1952, 74, 2718, and H. Frey et al., Chem. Eur. J. 2000, 6, no. 14, 2499 for the definition of dendrimeric and hyperbranched polymers.

"Hyperbranched" in the context of the present invention means that the degree of branching (DB), i.e. the average number of dendritic linkages plus the average number of end groups per molecule, is from 10 to 99.9%, preferably from 20 to 99%, particularly preferably from 20 to 95%.

"Dendrimeric" in the context of the present invention means that the degree of branching is from 99.9 to 100%. See H. Frey et al., Acta Polym. 1997, 48, 30 for the definition of "degree of branching".

Component B2) preferably has a number-average molar mass $M_n$ of from 100 to 15 000 g/mol, preferably from 200 to 12 000 g/mol, and in particular from 500 to 10 000 g/mol (GPC, PMMA standard).

The glass transition temperature Tg is in particular from −80 to +140° C., preferably from −60 to 120° C. (according to DSC, DIN 53765).

In particular, the viscosity (mPas) at 23° C. (to DIN 53019) is from 50 to 200 000, in particular from 100 to 150 000, and very particularly preferably from 200 to 100 000.

Component B2) is preferably obtainable via a process which comprises at least the following steps:

a) reaction of at least one organic carbonate (CA) of the general formula RO[(CO)]$_n$OR with at least one aliphatic, aliphatic/aromatic or aromatic alcohol (AL) which has at least 3 OH groups, with elimination of alcohols ROH to give one or more condensates (K), where each R, independently of the others, is a straight-chain or branched aliphatic, aromatic/aliphatic or aromatic hydrocarbon radical having from 1 to 20 carbon atoms, and where the radicals R may also have bonding to one another to form a ring, and n is a whole number from 1 to 5, or ab) reaction of phosgene, diphosgene, or triphosgene with an alcohol (AL) mentioned under a), with elimination of hydrogen chloride b) intermolecular reaction of the condensates (K) to give a highly functional, highly branched, or highly functional, hyperbranched polycarbonate, where the quantitative proportion of the OH groups to the carbonates in the reaction mixture is selected in such a way that the condensates (K) have an average of either one carbonate group and more than one OH group or one OH group and more than one carbonate group.

Phosgene, diphosgene, or triphosgene may be used as starting material, but preference is given to organic carbonates.

Each of the radicals R of the organic carbonates (CA) used as starting material and having the general formula RO(CO)OR is, independently of the others, a straight-chain or branched aliphatic, aromatic/aliphatic or aromatic hydrocarbon radical having from 1 to 20 carbon atoms. The two radicals R may also have bonding to one another to form a ring. The radical is preferably an aliphatic hydrocarbon radical, and particularly preferably a straight-chain or branched alkyl radical having from 1 to 5 carbon atoms, or a substituted or unsubstituted phenyl radical.

In particular, use is made of simple carbonates of the formula RO(CO)OR; n is preferably from 1 to 3, in particular 1.

By way of example, dialkyl or diaryl carbonates may be prepared from the reaction of aliphatic, araliphatic, or aromatic alcohols, preferably monoalcohols, with phosgene. They may also be prepared by way of oxidative carbonylation of the alcohols or phenols by means of CO in the presence of noble metals, oxygen, or $NO_x$. In relation to preparation methods for diaryl or dialkyl carbonates, see also "Ullmann's Encyclopedia of Industrial Chemistry", 6th edition, 2000 Electronic Release, Verlag Wiley-VCH.

Examples of suitable carbonates comprise aliphatic, aromatic/aliphatic or aromatic carbonates, such as ethylene carbonate, propylene 1,2- or 1,3-carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, or didodecyl carbonate.

Examples of carbonates where n is greater than 1 comprise dialkyl dicarbonates, such as di(tert-butyl) dicarbonate, or dialkyl tricarbonates, such as di(tert-butyl) tricarbonate.

It is preferable to use aliphatic carbonates, in particular those in which the radicals comprise from 1 to 5 carbon atoms, e.g. dimethyl carbonate, diethyl carbonate, dipropyl carbonate, dibutyl carbonate, or diisobutyl carbonate.

The organic carbonates are reacted with at least one aliphatic alcohol (AL) which has at least 3 OH groups, or with mixtures of two or more different alcohols.

Examples of compounds having at least three OH groups comprise glycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, diglycerol, triglycerol, polyglycerols, bis(trimethylolpropane), tris(hydroxymethyl) isocyanurate, tris(hydroxyethyl) isocyanurate, phloroglucinol, trihydroxytoluene, trihydroxydimethylbenzene, phloroglucides, hexahydroxybenzene, 1,3,5-benzenetrimethanol, 1,1,1-tris hexahydroxybenzene, 1,3,5-benzenetrimethanol, 1,1,1-tris (4'-hydroxyphenyl)methane, 1,1,1-tris(4'-hydroxyphenyl) ethane, or sugars, e.g. glucose, trihydric or higher polyhydric polyetherols based on trihydric or higher polyhydric alcohols and ethylene oxide, propylene oxide, or butylene oxide, or polyesterols. Particular preference is given here to glycerol, trimethylolethane, trimethylolpropane, 1,2,4-butanetriol, pentaerythritol, and also their polyetherols based on ethylene oxide or propylene oxide.

These polyhydric alcohols may also be used in a mixture with dihydric alcohols (AL'), with the proviso that the average OH functionality of all of the alcohols used is greater than 2. Examples of suitable compounds having two OH groups comprise ethylene glycol, diethylene glycol, triethylene glycol, 1,2- and 1,3-propanediol, dipropylene glycol, tripropylene glycol, neopentyl glycol, 1,2-, 1,3-, and 1,4-butanediol, 1,2-, 1,3-, and 1,5-pentanediol, hexanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl)propane, 1,1'-bis(4-hydroxyphenyl)-3,3,5-trimethylcyclohexane, resorcinol, hydroquinone, 4,4'-dihydroxyphenyl, bis(4-bis(hydroxyphenyl) sulphide, bis(4-hydroxyphenyl) sulphone, bis(hydroxymethyl)benzene, bis-(hydroxymethyl)toluene, bis(p-hydroxyphenyl)methane, bis(p-hydroxyphenyl)ethane, 2,2-bis(hydroxyphenyl)propane, 1,1-bis(p-hydroxyphenyl)cyclohexane, dihydroxybenzophenone, dihydric polyether polyols based on ethylene oxide, propylene oxide, butylene oxide, or mixtures of these, polytetrahydrofuran, polycaprolactone, or polyesterols based on diols and dicarboxylic acids.

The diols serve for fine adjustment of the properties of the polycarbonate. If use is made of dihydric alcohols, the ratio of dihydric alcohols (AL'), to the at least trihydric alcohols (AL) is set by the person skilled in the art and depends on the desired properties of the polycarbonate. The amount of the alcohol(s) (AL') is generally from 0 to 39.9 mol %, based on the total amount of all of the alcohols (AL) and (AL') taken together. The amount is preferably from 0 to 35 mol %, particularly preferably from 0 to 25 mol %, and very particularly preferably from 0 to 10 mol %.

The reaction of phosgene, diphosgene, or triphosgene with the alcohol or alcohol mixture generally takes place with elimination of hydrogen chloride, and the reaction of the carbonates with the alcohol or alcohol mixture to give the highly functional highly branched polycarbonate takes place with elimination of the monofunctional alcohol or phenol from the carbonate molecule.

The highly functional highly branched polycarbonates have termination by hydroxy groups and/or by carbonate groups after their preparation, i.e. with no further modification. They have good solubility in various solvents, e.g. in water, alcohols, such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate, or propylene carbonate.

For the purposes of this invention, a highly functional polycarbonate is a product which, besides the carbonate groups which form the polymer skeleton, further has at least three, preferably at least six, more preferably at least ten, terminal or pendant functional groups. The functional groups are carbonate groups and/or OH groups. There is in principle no upper restriction on the number of the terminal or pendant functional groups, but products having a very high number of functional groups can have undesired properties, such as high viscosity or poor solubility. The highly functional polycarbonates of the present invention mostly have no more than 500 terminal or pendant functional groups, preferably no more than 100 terminal or pendant functional groups.

When preparing the highly functional polycarbonates B2), it is necessary to adjust the ratio of the compounds comprising OH groups to phosgene or carbonate in such a way that the simplest resultant condensate (hereinafter termed condensate (K)) comprises an average of either one carbonate group or carbamoyl group and more than one OH group or one OH group and more than one carbonate group or carbamoyl group. The simplest structure of the condensate (K) composed of a carbonate (A) and a di- or polyalcohol (B) here results in the arrangement XYn or YnX, where X is a carbonate group, Y is a hydroxy group, and n is generally a number from 1 to 6, preferably from 1 to 4, particularly preferably from 1 to 3. The reactive group which is the single resultant group here is generally termed "focal group" below.

By way of example, if during the preparation of the simplest condensate (K) from a carbonate and a dihydric alcohol the reaction ratio is 1:1, the average result is a molecule of XY type, illustrated by the general formula (V).

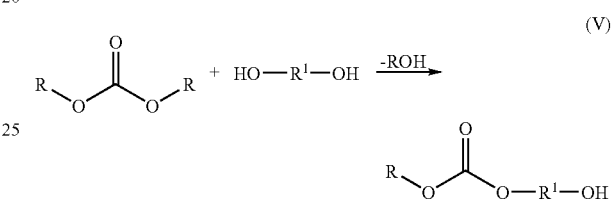

During the preparation of the condensate (K) from a carbonate and a trihydric alcohol with a reaction ratio of 1:1, the average result is a molecule of $XY_2$ type, illustrated by the general formula (VI). A carbonate group is focal group here.

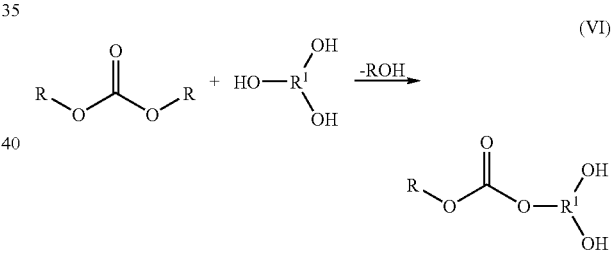

During the preparation of the condensate (K) from a carbonate and a tetrahydric alcohol, likewise with the reaction ratio 1:1, the average result is a molecule of $XY_3$ type, illustrated by the general formula (VII). A carbonate group is focal group here.

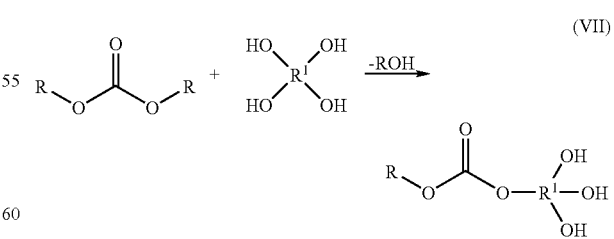

R in the formulae (V) to (VII) has the definition given above, and $R^1$ is an aliphatic or aromatic radical.

The condensate (K) may, by way of example, also be prepared from a carbonate and a trihydric alcohol, as illustrated by the general formula (VIII), the molar reaction ratio being 2:1. Here, the average result is a molecule of $X_2Y$ type, an OH group being focal group here. In formula (VIII), R and $R^1$ are as defined in formulae (V) to (VII).

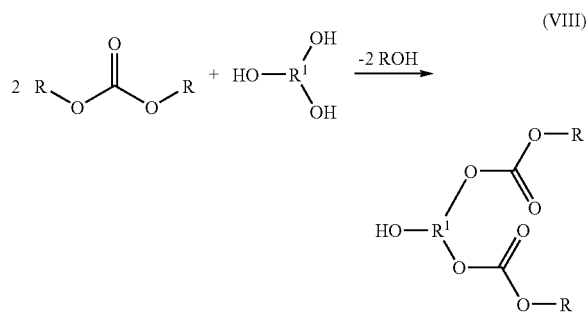

(VIII)

If difunctional compounds, e.g. a dicarbonate or a diol, are also added to the components, this extends the chains, as illustrated by way of example in the general formula (IX). The average result is again a molecule of $XY_2$ type, a carbonate group being focal group.

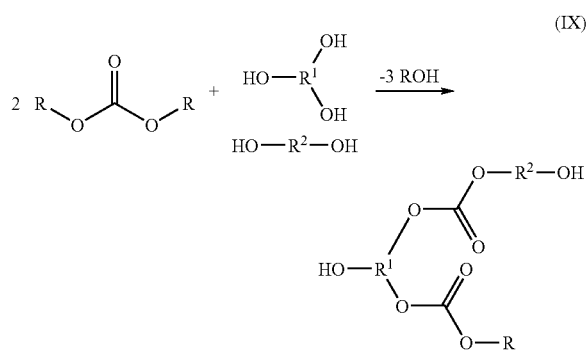

(IX)

In formula (IX), $R^2$ is an organic, preferably aliphatic radical, and R and $R^1$ are as defined above.

It is also possible to use two or more condensates (K) for the synthesis. Here, firstly two or more alcohols or two or more carbonates may be used. Furthermore, mixtures of various condensates of different structure can be obtained via the selection of the ratio of the alcohols used and of the carbonates or the phosgenes. This may be illustrated taking the example of the reaction of a carbonate with a trihydric alcohol. If the starting products are reacted in a ratio of 1:1, as shown in (VI), the result is an $XY_2$ molecule. If the starting products are reacted in a ratio of 2:1, as shown in (VIII), the result is an $X_2Y$ molecule. If the ratio is from 1:1 to 2:1, the result is a mixture of $XY_2$ and $X_2Y$ molecules.

According to the invention, the simple condensates (K) described by way of example in the formulae (V) to (IX) preferentially react intermolecularly to form highly functional polycondensates, hereinafter termed polycondensates (P). The reaction to give the condensate (K) and to give the polycondensate (P) usually takes place at a temperature of from 0 to 250° C., preferably from 60 to 160° C., in bulk or in solution.

Use may generally be made here of any of the solvents which are inert with respect to the respective starting materials. Preference is given to use of organic solvents, e.g. decane, dodecane, benzene, toluene, chlorobenzene, xylene, dimethylformamide, dimethylacetamide, or solvent naphtha.

In one embodiment, the condensation reaction is carried out in bulk. To accelerate the reaction, the phenol or the monohydric alcohol ROH liberated during the reaction can be removed by distillation from the reaction equilibrium if appropriate at reduced pressure.

If removal by distillation is intended, it is generally advisable to use those carbonates which liberate alcohols ROH with a boiling point below 140° C. during the reaction.

Catalysts or catalyst mixtures may also be added to accelerate the reaction. Suitable catalysts are compounds which catalyze esterification or transesterification reactions, e.g. alkali metal hydroxides, alkali metal carbonates, alkali metal hydrogencarbonates, preferably of sodium, of potassium, or of cesium, tertiary amines, guanidines, ammonium compounds, phosphonium compounds, organoaluminium, organotin, organozinc, organotitanium, organozirconium, or organobismuth compounds, or else what are known as double metal cyanide (DMC) catalysts, e.g. as described in DE-A 10138216 or DE-A 10147712.

It is preferable to use potassium hydroxide, potassium carbonate, potassium hydrogencarbonate, diazabicyclooctane (DABCO), diazabicyclononene (DBN), diazabicycloundecene (DBU), imidazoles, such as imidazole, 1-methylimidazole, or 1,2-dimethylimidazole, titanium tetrabutoxide, titanium tetraisopropoxide, dibutyltin oxide, dibutyltin dilaurate, stannous dioctoate, zirconium acetylacetonate, or mixtures thereof.

The amount of catalyst generally added is from 50 to 10 000 ppm by weight, preferably from 100 to 5000 ppm by weight, based on the amount of the alcohol mixture or alcohol used.

It is also possible to control the intermolecular polycondensation reaction via addition of the suitable catalyst or else via selection of a suitable temperature. The average molecular weight of the polymer (P) may moreover be adjusted by way of the composition of the starting components and by way of the residence time.

The condensates (K) and the polycondensates (P) prepared at an elevated temperature are usually stable at room temperature for a relatively long period.

The nature of the condensates (K) permits polycondensates (P) with different structures to result from the condensation reaction, these having branching but no crosslinking. Furthermore, in the ideal case, the polycondensates (P) have either one carbonate group as focal group and more than two OH groups or else one OH group as focal group and more than two carbonate groups. The number of the reactive groups here is the result of the nature of the condensates (K) used and the degree of polycondensation.

By way of example, a condensate (K) according to the general formula (II) can react via triple intermolecular condensation to give two different polycondensates (P), represented in the general formulae (X) and (XI).

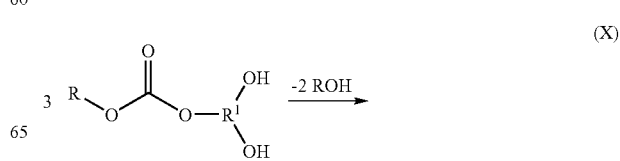

(X)

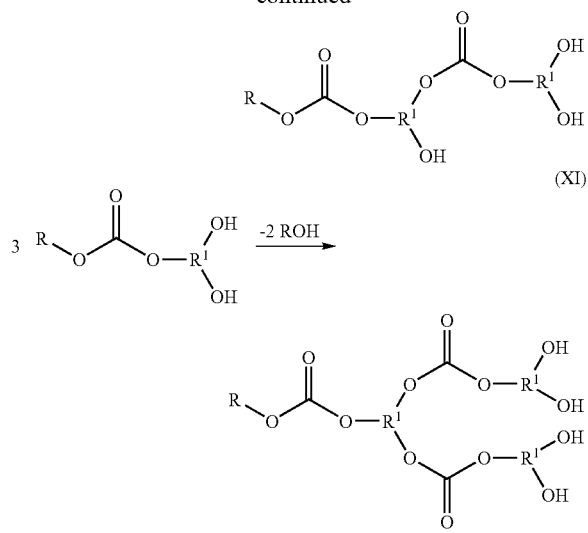

In formula (X) and (XI), R and R¹ are as defined above.

There are various ways of terminating the intermolecular polycondensation reaction. By way of example, the temperature may be lowered to a range where the reaction stops and the product (K) or the polycondensate (P) is storage-stable.

It is also possible to deactivate the catalyst, for example in the case of basic catalysts via addition of Lewis acids or proton acids.

In another embodiment, as soon as the intermolecular reaction of the condensate (K) has produced a polycondensate (P) with the desired degree of polycondensation, a product having groups reactive toward the focal group of (P) may be added to the product (P) to terminate the reaction. In the case of a carbonate group as focal group, by way of example, a mono-, di-, or polyamine may therefore be added. In the case of a hydroxy group as focal group, by way of example, a mono-, di-, or polyisocyanate, or a compound comprising epoxy groups, or an acid derivative which reacts with OH groups, can be added to the product (P).

The highly functional polycarbonates are mostly prepared in a pressure range from 0.1 mbar to 20 bar, preferably at from 1 mbar to 5 bar, in reactors or reactor cascades which are operated batchwise, semicontinuously, or continuously.

The inventive products can be further processed without further purification after their preparation by virtue of the abovementioned adjustment of the reaction conditions and, if appropriate, by virtue of the selection of the suitable solvent.

In another preferred embodiment, the product is stripped, i.e. freed from low-molecular-weight, volatile compounds. For this, once the desired degree of conversion has been reached the catalyst may optionally be deactivated and the low-molecular-weight volatile constituents, e.g. monoalcohols, phenols, carbonates, hydrogen chloride, or volatile oligomeric or cyclic compounds, can be removed by distillation, if appropriate with introduction of a gas, preferably nitrogen, carbon dioxide, or air, if appropriate at reduced pressure.

In another preferred embodiment, the polycarbonates may comprise other functional groups besides the functional groups present at this stage by virtue of the reaction. The functionalization may take place during the process to increase molecular weight, or else subsequently, i.e. after completion of the actual polycondensation.

If, prior to or during the process to increase molecular weight, components are added which have other functional groups or functional elements besides hydroxy or carbonate groups, the result is a polycarbonate polymer with randomly distributed functionalities other than the carbonate groups or hydroxy groups.

Effects of this type can, by way of example, be achieved via addition, during the polycondensation, of compounds which bear other functional groups or functional elements, such as mercapto groups, primary, secondary or tertiary amino groups, ether groups, derivatives of carboxylic acids, derivatives of sulphonic acids, derivatives of phosphonic acids, silane groups, siloxane groups, aryl radicals, or long-chain alkyl radicals, besides hydroxy groups, carbonate groups or carbamoyl groups. Examples of compounds which may be used for modification by means of carbamate groups are ethanolamine, propanolamine, isopropanolamine, 2-(butylamino)ethanol, 2-(cyclohexylamino)ethanol, 2-amino-1-butanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)aminomethane, tris(hydroxy-ethyl)aminomethane, ethylenediamine, propylenediamine, hexamethylenediamine or isophoronediamine.

An example of a compound which can be used for modification with mercapto groups is mercaptoethanol. By way of example, tertiary amino groups can be produced via incorporation of N-methyldiethanolamine, N-methyldipropanolamine or N,N-dimethylethanolamine. By way of example, ether groups may be generated via co-condensation of dihydric or higher polyhydric polyetherols. Long-chain alkyl radicals can be introduced via reaction with long-chain alkanediols, and reaction with alkyl or aryl diisocyanates generates polycarbonates having alkyl, aryl, and urethane groups, or urea groups.

Ester groups can be produced via addition of dicarboxylic acids, tricarboxylic acids, or, for example, dimethyl terephthalate, or tricarboxylic esters.

Subsequent functionalization can be achieved by using an additional step of the process to react the resultant highly functional, highly branched, or highly functional hyperbranched polycarbonate with a suitable functionalizing reagent which can react with the OH and/or carbonate groups or carbamoyl groups of the polycarbonate.

By way of example, highly functional highly branched, or highly functional hyperbranched polycarbonates comprising hydroxy groups can be modified via addition of molecules comprising acid groups or isocyanate groups. By way of example, polycarbonates comprising acid groups can be obtained via reaction with compounds comprising anhydride groups.

Highly functional polycarbonates comprising hydroxy groups may moreover also be converted into highly functional polycarbonate polyether polyols via reaction with alkylene oxides, e.g. ethylene oxide, propylene oxide, or butylene oxide.

The improved-flow moulding compositions to be used for the production of the inventive hybrid-based lightweight components can comprise, as component B3), at least one hyperbranched polyester of $A_xB_y$ type, where x is at least 1.1, preferably at least 1.3, in particular at least 2 and y is at least 2.1, preferably at least 2.5, in particular at least 3.

Use may also be made of mixtures as units A and/or B, of course.

An $A_xB_y$-type polyester is a condensate composed of an x-functional molecule A and a y-functional molecule B. By way of example, mention may be made of a polyester composed of adipic acid as molecule A (x=2) and glycerol as molecule B (y=3).

For the purposes of this invention, hyperbranched polyesters B3) are non-crosslinked macromolecules having hydroxy groups and carboxy groups, these having both structural and molecular non-uniformity. Their structure may firstly be based on a central molecule in the same way as dendrimers, but with non-uniform chain length of the branches. Secondly, they may also have a linear structure with functional pendant groups, or else they may combine the two extremes, having linear and branched molecular portions. See also P. J. Flory, J. Am. Chem. Soc. 1952, 74, 2718, and H. Frey et al., Chem. Eur. J. 2000, 6, no. 14, 2499 for the definition of dendrimeric and hyperbranched polymers.

"Hyperbranched" in the context of the present invention means that the degree of branching (DB), i.e. the average number of dendritic linkages plus the average number of end groups per molecule, is from 10 to 99.9%, preferably from 20 to 99%, particularly preferably from 20 to 95%. "Dendrimeric" in the context of the present invention means that the degree of branching is from 99.9 to 100%. See H. Frey et al., Acta Polym. 1997, 48, 30 for the definition of "degree of branching".

Component B3) preferably has a molecular weight of from 300 to 30 000 g/mol, in particular from 400 to 25 000 g/mol, and very particularly from 500 to 20 000 g/mol, determined by means of GPC, PMMA standard, dimethylacetamide eluent.

B3) preferably has an OH number of from 0 to 600 mg KOH/g of polyester, preferably from 1 to 500 mg KOH/g of polyester, in particular from 20 to 500 mg KOH/g of polyester to DIN 53240, and preferably a COOH number of from 0 to 600 mg KOH/g of polyester, preferably from 1 to 500 mg KOH/g of polyester, and in particular from 2 to 500 mg KOH/g of polyester.

The Tg (glass transition temperature) is preferably from −50° C. to 140° C., and in particular from −50 to 100° C. (by means of DSC, to DIN 53765).

Preference is particularly given to those components B3) in which at least one OH or COOH number is greater than 0, preferably greater than 0.1, and in particular greater than 0.5.

The component B3) is obtainable via the processes described below, for example by reacting (m) one or more dicarboxylic acids or one or more derivatives of the same with one or more at least trihydric alcohols
or
(n) one or more tricarboxylic acids or higher polycarboxylic acids or one or more derivatives of the same with one or more diols in the presence of a solvent and optionally in the presence of an inorganic, organometallic, or low-molecular-weight organic catalyst, or of an enzyme. The reaction in solvent is the preferred preparation method.

Highly functional hyperbranched polyesters B3) have molecular and structural non-uniformity. Their molecular non-uniformity distinguishes them from dendrimers, and they can therefore be prepared at considerably lower cost.

Among the dicarboxylic acids which can be reacted according to variant (m) are, by way of example, oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, and cis- and trans-cyclopentane-1,3-dicarboxylic acid, and the abovementioned dicarboxylic acids may have substitution by one or more radicals selected from $C_1$-$C_{10}$-alkyl groups, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, and n-decyl, $C_3$-$C_{12}$-cycloalkyl groups, such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl, and cycloheptyl; alkylene groups, such as methylene or ethylidene, or $C_6$-$C_{14}$-aryl groups, such as phenyl, 1-naphthyl, 2-naphthyl, 1-anthryl, 2-anthryl, 9-anthryl, 1-phenanthryl, 2-phenanthryl, 3-phenanthryl, 4-phenanthryl, and 9-phenanthryl, preferably phenyl, 1-naphthyl, and 2-naphthyl, particularly preferably phenyl.

Examples which may be mentioned as representatives of substituted dicarboxylic acids are: 2-methylmalonic acid, 2-ethylmalonic acid, 2-phenylmalonic acid, 2-methylsuccinic acid, 2-ethylsuccinic acid, 2-phenylsuccinic acid, itaconic acid, 3,3-dimethylglutaric acid.

Among the dicarboxylic acids which can be reacted according to variant (m) are also ethylenically unsaturated acids, such as maleic acid and fumaric acid, and aromatic dicarboxylic acids, such as phthalic acid, isophthalic acid or terephthalic acid.

It is also possible to use mixtures of two or more of the abovementioned representative compounds.

The dicarboxylic acids may either be used as they stand or be used in the form of derivatives.

Derivatives are preferably
the relevant anhydrides in monomeric or else polymeric form,
mono- or dialkyl esters, preferably mono- or dimethyl esters, or the corresponding mono- or diethyl esters, or else the mono- and dialkyl esters derived from higher alcohols, such as n-propanol, isopropanol, n-butanol, isobutanol, tert-butanol, n-pentanol, n-hexanol,
and also mono- and divinyl esters, and
mixed esters, preferably methyl ethyl esters.

However, it is also possible to use a mixture composed of a dicarboxylic acid and one or more of its derivatives. Equally, it is possible to use a mixture of two or more different derivatives of one or more dicarboxylic acids.

It is particularly preferable to use succinic acid, glutaric acid, adipic acid, phthalic acid, isophthalic acid, terephthalic acid, or the mono- or dimethyl esters thereof. It is very particularly preferable to use adipic acid.

Examples of at least trihydric alcohols which may be reacted are: glycerol, butane-1,2,4-triol, n-pentane-1,2,5-triol, n-pentane-1,3,5-triol, n-hexane-1,2,6-triol, n-hexane-1,2,5-triol, n-hexane-1,3,6-triol, trimethylolbutane, trimethylolpropane or ditrimethylolpropane, trimethylolethane, pentaerythritol or dipentaerythritol; sugar alcohols, such as mesoerythritol, threitol, sorbitol, mannitol, or mixtures of the above at least trihydric alcohols. It is preferable to use glycerol, trimethylolpropane, trimethylolethane, and pentaerythritol.

Examples of tricarboxylic acids or polycarboxylic acids which can be reacted according to variant (n) are benzene-1,2,4-tricarboxylic acid, benzene-1,3,5-tricarboxylic acid, benzene-1,2,4,5-tetracarboxylic acid, and mellitic acid.

Tricarboxylic acids or polycarboxylic acids may be used in the inventive reaction either as they stand or else in the form of derivatives.

Derivatives are preferably
the relevant anhydrides in monomeric or else polymeric form, mono-, di-, or trialkyl esters, preferably mono-, di-, or trimethyl esters, or the corresponding mono-, di-, or triethyl esters, or else the mono-, di-, and triesters derived from higher alcohols, such as n-propanol, isopropanol, n-butanol, isobutanol, tert-butanol, n-pentanol, n-hexanol, or else mono-, di-, or trivinyl esters and mixed methyl ethyl esters.

It is also possible to use a mixture composed of a tri- or polycarboxylic acid and one or more of its derivatives. It is likewise possible to use a mixture of two or more different derivatives of one or more tri- or polycarboxylic acids, in order to obtain component B3).

Examples of diols used for variant (n) are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,10-decanediol, 1,2-decanediol, 1,12-dodecanediol, 1,2-dodecanediol, 1,5-hexadiene-3,4-diol, cyclopentanediols, cyclohexanediols, inositol and derivatives, (2)-methylpentane-2,4-diol, 2,4-dimethylpentane-2,4-diol, 2-ethylhexane-1,3-diol, 2,5-dimethylhexane-2,5-diol, 2,2,4-trimethylpentane-1,3-diol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H or mixtures of two or more representative compounds of the above compounds, where n is a whole number and n=4. One, or else both, hydroxy groups here in the abovementioned diols may also be replaced by SH groups. Preference is given to ethylene glycol, propane-1,2-diol, and diethylene glycol, triethylene glycol, dipropylene glycol, and tripropylene glycol.

The molar ratio of the molecules A to molecules B in the $A_xB_y$ polyester in the variants (m) and (n) is from 4:1 to 1:4, in particular from 2:1 to 1:2.

The at least trihydric alcohols reacted according to variant (m) may have hydroxy groups of which all have identical reactivity. Preference is also given here to at least trihydric alcohols whose OH groups initially have identical reactivity, but where reaction with at least one acid group can induce a fall-off in reactivity of the remaining OH groups as a result of steric or electronic effects. By way of example, this applies when trimethylolpropane or pentaerythritol is used.

However, the at least trihydric alcohols reacted according to variant (m) may also have hydroxy groups having at least two different chemical reactivities.

The different reactivity of the functional groups here may derive either from chemical causes (e.g. primary/secondary/tertiary OH group) or from steric causes.

By way of example, the triol may comprise a triol which has primary and secondary hydroxy groups, a preferred example being glycerol.

When the reaction is carried out according to variant (m), it is preferable to operate in the absence of diols and of monohydric alcohols.

When the reaction is carried out according to variant (n), it is preferable to operate in the absence of mono- or dicarboxylic acids.

The process is carried out in the presence of a solvent. By way of example, hydrocarbons are suitable, such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene, and ortho- and meta-dichlorobenzene. Other solvents very particularly suitable in the absence of acidic catalysts are: ethers, such as dioxane or tetrahydrofuran, and ketones, such as methyl ethyl ketone and methyl isobutyl ketone.

The amount of solvent added is at least 0.1% by weight, based on the weight of the starting materials used and to be reacted, preferably at least 1% by weight, and particularly preferably at least 10% by weight. It is also possible to use excesses of solvent, based on the weight of starting materials used and to be reacted, e.g. from 1.01 to 10 times the amount. Solvent amounts of more than 100 times the weight of the starting materials used and to be reacted are not advantageous, because the reaction rate decreases markedly at markedly lower concentrations of the reactants, giving uneconomically long reaction times.

To carry out the process, operations may be carried out in the presence of a dehydrating agent as additive, added at the start of the reaction. Suitable examples are molecular sieves, in particular 4 Å molecular sieve, $MgSO_4$, and $Na_2SO_4$. During the reaction it is also possible to add further dehydrating agent or to replace dehydrating agent by fresh dehydrating agent. During the reaction it is also possible to remove the water or alcohol formed by distillation and, for example, to use a water trap.

The process may be carried out in the absence of acidic catalysts. It is preferable to operate in the presence of an acidic inorganic, organometallic, or organic catalyst, or a mixture composed of two or more acidic inorganic, organometallic, or organic catalysts.

Examples of acidic inorganic catalysts are sulphuric acid, phosphoric acid, phosphonic acid, hypophosphorous acid, aluminium sulphate hydrate, alum, acidic silica gel (pH=6, in particular =5), and acidic aluminium oxide. Examples of other compounds which can be used as acidic inorganic catalysts are aluminium compounds of the general formula $Al(OR)_3$ and titanates of the general formula $Ti(OR)_4$, where each of the radicals R may be identical or different and is selected independently of the others from $C_1$-$C_{10}$-alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, and n-decyl, $C_3$-$C_{12}$-cycloalkyl radicals, such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl, and cycloheptyl.

Each of the radicals R in $Al(OR)_3$ or $Ti(OR)_4$ is preferably identical and selected from isopropyl or 2-ethylhexyl.

Examples of preferred acidic organometallic catalysts are selected from dialkyltin oxides $R_2SnO$, where R is defined as above. A particularly preferred representative compound for acidic organometallic catalysts is di-n-butyltin oxide, which is commercially available as "oxo-tin", or di-n-butyltin dilaurate.

Preferred acidic organic catalysts are acidic organic compounds having, by way of example, phosphate groups, sulphonic acid groups, sulphate groups, or phosphonic acid groups. Particular preference is given to sulphonic acids, such as para-toluenesulphonic acid. Acidic ion exchangers may also be used as acidic organic catalysts, e.g. polystyrene resins comprising sulphonic acid groups and crosslinked with about 2 mol % of divinylbenzene.

It is also possible to use combinations of two or more of the abovementioned catalysts. It is also possible to use an immobilized form of those organic or organometallic, or else inorganic catalysts which take the form of discrete molecules.

If the intention is to use acidic inorganic, organometallic, or organic catalysts, according to the invention the amount used is from 0.1 to 10% by weight, preferably from 0.2 to 2% by weight, of catalyst.

The preparation process for component B3) is carried out under an inert gas, for example under carbon dioxide, nitrogen or a noble gas, among which particular mention may be made of argon. The inventive process is carried out at temperatures of from 60 to 200° C. It is preferable to operate at temperatures of from 130 to 180° C., in particular up to 150° C., or below that temperature. Maximum temperatures up to 145° C. are particularly preferred, and temperatures up to 135° C. are very particularly preferred. The pressure conditions for the preparation process are not critical. It is possible to operate at markedly reduced pressure, e.g. at from 10 to 500 mbar. The process may also be carried out at pressures above 500 mbar. The reaction at atmospheric pressure is preferred for reasons of simplicity; however, conduct at slightly increased pressure is also possible, e.g. up to 1200 mbar. It is also possible to operate at markedly increased pressure, e.g. at pressures up to 10 bar. Reaction at atmospheric pressure is preferred. The reaction time is usually from 10 minutes to 25 hours, preferably from 30 minutes to 10 hours, and particularly preferably from one to 8 hours.

Once the reaction has ended, the highly functional hyperbranched polyesters (B3) can easily be isolated, e.g. by removing the catalyst by filtration and concentrating the mixture, the concentration process here usually being carried out at reduced pressure. Other work-up methods with good suitability are precipitation after addition of water, followed by washing and drying.

Component B3) can also be prepared in the presence of enzymes or decomposition products of enzymes (according to DE-A 10 163 163). For the purposes of the present invention, the term acidic organic catalysts does not include the dicarboxylic acids reacted according to the invention.

It is preferable to use lipases or esterases. Lipases and esterases with good suitability are *Candida cylindracea, Candida lipolytica, Candida rugosa, Candida antarctica, Candida utilis, Chromobacterium viscosum, Geotrichum viscosum, Geotrichum candidum, Mucor javanicus, Mucor mihei*, pig pancreas, *pseudomonas* spp., *pseudomonas fluorescens, Pseudomonas cepacia, Rhizopus arrhizus, Rhizopus delemar, Rhizopus niveus, Rhizopus oryzae, Aspergillus niger, Penicillium roquefortii, Penicillium camembertii*, or esterase from *Bacillus* spp. and *Bacillus thermoglucosidasius. Candida antarctica* lipase B is particularly preferred. The enzymes listed are commercially available, for example from Novozymes Biotech Inc., Denmark.

The enzyme is preferably used in immobilized form, for example on silica gel or Lewatit®. The processes for immobilizing enzymes are known, e.g. from Kurt Faber, "Biotransformations in Organic Chemistry", 3rd edition 1997, Springer Verlag, Chapter 3.2 "Immobilization" pp. 345-356. Immobilized enzymes are commercially available, for example from Novozymes Biotech Inc., Denmark.

The amount of immobilized enzyme to be used is from 0.1 to 20% by weight, in particular from 10 to 15% by weight, based on the total weight of the starting materials used and to be reacted.

The process using enzymes is carried out at temperatures above 60° C. It is preferable to operate at temperatures of 100° C. or below that temperature. Preference is given to temperatures up to 80° C., very particular preference is given to temperatures of 62 to 75° C., and still more preference is given to temperatures of from 65 to 75° C.

The process using enzymes is carried out in the presence of a solvent. Examples of suitable compounds are hydrocarbons, such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene and ortho- and meta-dichlorobenzene. Other very particularly suitable solvents are: ethers, such as dioxane or tetrahydrofuran, and ketones, such as methyl ethyl ketone and methyl isobutyl ketone.

The amount of solvent added is at least 5 parts by weight, based on the weight of the starting materials used and to be reacted, preferably at least 50 parts by weight, and particularly preferably at least 100 parts by weight. Amounts of more than 10 000 parts by weight of solvent are undesirable, because the reaction rate decreases markedly at markedly lower concentrations, giving uneconomically long reaction times.

The process using enzymes is carried out at pressures above 500 mbar. Preference is given to the reaction at atmospheric pressure or slightly increased pressure, for example at up to 1200 mbar. It is also possible to operate under markedly increased pressure, for example at pressures up to 10 bar. The reaction at atmospheric pressure is preferred.

The reaction time for the process using enzymes is usually from 4 hours to 6 days, preferably from 5 hours to 5 days, and particularly preferably from 8 hours to 4 days.

Once the reaction has ended, the highly functional hyperbranched polyesters can be isolated, e.g. by removing the enzyme by filtration and concentrating the mixture, this concentration process usually being carried out at reduced pressure. Other work-up methods with good suitability are precipitation after addition of water, followed by washing and drying.

The highly functional, hyperbranched polyesters B3) obtainable by this enzyme-based process feature particularly low contents of discoloured and resinified material. For the definition of hyperbranched polymers, see also: P. J. Flory, J. Am. Chem. Soc. 1952, 74, 2718, and A. Sunder et al., Chem. Eur. J. 2000, 6, no. 1, 1-8. However, in the context of the present invention, "highly functional hyperbranched" means that the degree of branching, i.e. the average number of dendritic linkages plus the average number of end groups per molecule, is from 10 to 99.9%, preferably from 20 to 99%, particularly preferably from 30 to 90% (see in this connection H. Frey et al. Acta Polym. 1997, 48, 30).

The molar mass $M_w$ of the polyesters B3) is from 500 to 50 000 g/mol, preferably from 1000 to 20 000 g/mol, particularly preferably from 1000 to 19 000 g/mol. The polydispersity is from 1.2 to 50, preferably from 1.4 to 40, particularly preferably from 1.5 to 30, and very particularly preferably from 1.5 to 10. They are usually very soluble, i.e. clear solutions can be prepared using up to 50% by weight, in some cases even up to 80% by weight, of the polyesters B3) in tetrahydrofuran (THF), n-butyl acetate, ethanol, and numerous other solvents, with no gel particles detectable by the naked eye.

The highly functional hyperbranched polyesters B3) are carboxy-terminated, carboxy- and hydroxy-terminated or hydroxy-terminated, but preferably only hydroxy-terminated.

The hyperbranched polycarbonates B2)/polyesters B3) used are particles whose size is from 20 to 500 nm. These nanoparticles are in finely dispersed form in the polymer blend, the size of the particles in the compounded material being from 20 to 500 nm, preferably from 50 to 300 nm.

Compounded materials of this type are available commercially, e.g. as Ultradur® high speed.

The polyalkylene glycol esters (PAGE) B4) with low molecular weight, of the general formula (I)

in which
R is a branched or straight-chain alkyl group having from 1 to 20 carbon atoms,
Z is a branched or straight-chain $C_2$ to $C_{15}$ alkylene group, and
n is a whole number from 2 to 20,
can likewise be used as flow improvers, and are known from WO 98/11164 A1. Particular preference is given to triethylene glycol bis(2-ethylhexanoate) (TEG-EH), marketed as TEG-EH-Plasticizer, CAS No. 94-28-0, by Eastman Chemical B.V., The Hague, Netherlands.

If a mixture of B) components is used, the ratios of the components B1) to B2) or B2) to B3) or B1) to B3) or B1) to B4) or B2) to B4) or B3) to B4) are preferably from 1:20 to 20:1, in particular from 1:15 to 15:1 and very particularly from 1:5 to 5:1. If a ternary mixture is used composed of, for example, B1), B2) and B3), the mixing ratio is preferably from 1:1:20 to 1:20:1 or up to 20:1:1. This applies likewise to ternary mixtures using B4).

In one preferred embodiment, the present invention provides lightweight components composed of a parent body composed of galvanized iron and having reinforcing structures, where the reinforcing structures have been securely connected to the parent body and are composed of moulded-on thermoplastic, characterized in that the thermoplastic used comprises polymer moulding compositions comprising
A) from 99.99 to 10 parts by weight, preferably from 99.5 to 40 parts by weight, particularly preferably from 99.0 to 55 parts by weight, of polyamide and
B1) from 0.01 to 50 parts by weight, preferably from 0.25 to 20 parts by weight, particularly preferably from 1.0 to 15 parts by weight, of at least one copolymer composed of at least one olefin, preferably of one α-olefin, with at least one methacrylate or acrylate of an aliphatic alcohol, preferably of an aliphatic alcohol having from 1 to 30 carbon atoms with MFI not less than 100 g/10 min, where the MFI (Melt Flow Index) is measured or determined at 190° C. with a test weight of 2.16 kg, and the secure interlock connection between parent body and thermoplastic is achieved by way of the galvanized surface of the parent body, and this surface has additionally been pretreated by a process from the group of acid treatment, soda treatment, amine treatment, anodic treatment, base treatment or laser treatment.

In one particularly preferred embodiment, the present invention provides lightweight components obtainable from polymer moulding compositions of components A) and B1) whose parent body is of shell-type design, where the exterior or interior of the said body additionally has reinforcing structures securely connected to the parent body and composed of the same moulded-on thermoplastic, and, in one alternative embodiment, the connection of these to the parent body is additionally achieved at discrete connection sites. These discrete connection sites can preferably be perforations in the parent body, where the thermoplastic passes through these perforations and extends over the area of the perforations, thus additionally reinforcing the secure interlock connection which is in any case already being achieved by way of the galvanized surface of the iron parent body. The reinforcing structures are preferably of rib shape or of honeycomb shape.

In another preferred embodiment of the present invention, moulding compositions used for the lightweight components of hybrid design also comprise, in addition to components A) and, if appropriate, B), C) from 0.001 to 75 parts by weight, preferably from 10 to 70 parts by weight, particularly preferably from 20 to 65 parts by weight, with particular preference from 30 to 65 parts by weight, of a filler or reinforcing material.

The filler or reinforcing material used can also comprise a mixture composed of two or more different fillers and/or reinforcing materials, for example based on talc, or mica, silicate, quartz, titanium dioxide, wollastonite, kaolin, amorphous silicas, magnesium carbonate, chalk, feldspar, barium sulphate, glass beads and/or fibrous fillers and/or reinforcing materials based on carbon fibres and/or glass fibres. It is preferable to use mineral particulate fillers based on talc, mica, silicate, quartz, titanium dioxide, wollastonite, kaolin, amorphous silicas, magnesium carbonate, chalk, feldspar, barium sulphate and/or glass fibres. It is particularly preferable to use mineral particulate fillers based on talc, wollastonite, kaolin and/or glass fibres, very particular preference being given to glass fibres.

Particularly for applications in which isotropy in dimensional stability and high thermal dimensional stability is demanded, as for example in motor vehicle applications for external bodywork parts, it is preferable to use mineral fillers, in particular talc, wollastonite or kaolin.

Particular preference is moreover also given to the use of acicular mineral fillers. According to the invention, the term acicular mineral fillers means a mineral filler having pronounced acicular character. An example that may be mentioned is acicular wollastonites. The length:diameter ratio of the mineral is preferably from 2:1 to 35:1, particularly preferably from 3:1 to 19:1, with particular preference from 4:1 to 12:1. The average particle size, determined using a CILAS GRANULOMETER, of the inventive acicular minerals is preferably smaller than 20 μm, particularly preferably smaller than 15 μm, with particular preference smaller than 10 μm.

The filler and/or reinforcing material can, if appropriate, have been surface-modified, for example with a coupling agent or coupling-agent system, for example based on silane. However, this pre-treatment is not essential. However, in particular when glass fibres are used it is also possible to use polymer dispersions, film-formers, branching agents and/or glass-fibre-processing aids, in addition to silanes.

The glass fibres whose use is particularly preferred according to the invention are added in the form of continuous-filament fibres or in the form of chopped or ground glass fibres, their fibre diameter generally being from 7 to 18 μm, preferably from 9 to 15 μm. The fibres can have been provided with a suitable size system and with a coupling agent or coupling-agent system, for example based on silane.

Coupling agents based on silane and commonly used for the pretreatment process are silane compounds, preferably silane compounds of the general formula (XIII)

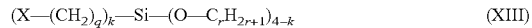

in which
X is $NH_2$—, HO— or

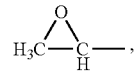

q is a whole number from 2 to 10, preferably from 3 to 4,
r is a whole number from 1 to 5, preferably from 1 to 2 and
k is a whole number from 1 to 3, preferably 1.

Coupling agents to which further preference is given are silane compounds from the group of aminopropyltrimethoxysilane, aminobutyltrimethoxysilane, aminopropyltriethoxysilane, aminobutyltriethoxysilane, and also the corresponding silanes which have a glycidyl group as substituent X.

The amounts generally used of the silane compounds for surface coating for modification of the fillers is from 0.05 to 2% by weight, preferably from 0.25 to 1.5% by weight and in particular from 0.5 to 1% by weight, based on the mineral filler.

As a result of the processing to give the moulding composition or moulding, the d97 value or d50 value of the particulate fillers can be smaller in the moulding composition or in the moulding than in the fillers originally used. As a result of the processing to give the moulding composition or moulding, the length distributions of the glass fibres in the moulding composition or the moulding can be shorter than those originally used.

In an alternative preferred embodiment, the polymer moulding compositions to be used for the production of the lightweight components of hybrid design according to the invention can also, if appropriate, comprise, in addition to components A) and, if appropriate, B) and/or C), or instead of B) and/or C), D) from 0.001 to 30 parts by weight, preferably from 5 to 25 parts by weight, particularly preferably from 9 to 19 parts by weight, of at least one flame-retardant additive.

The flame-retardant additive or flame retardant D) used can comprise commercially available organic halogen compounds with synergists or can comprise commercially available organic nitrogen compounds or organic/inorganic phosphorus compounds, individually or in a mixture. It is also possible to use flame-retardant additives such as magnesium hydroxide or Ca Mg carbonate hydrates (e.g. DE-A 4 236 122 (=CA 2109024 A1)). It is also possible to use salts of aliphatic or aromatic sulphonic acids. Examples that may be mentioned of halogen-containing, in particular brominated and chlorinated, compounds are: ethylene-1,2-bistetrabromophthalimide, epoxidized tetrabromobisphenol A resin, tetrabromobisphenol A oligocarbonate, tetrachlorobisphenol A oligo-carbonate, pentabromopolyacrylate, brominated polystyrene and decabromodiphenyl ether. Examples of suitable organic phosphorus compounds are the phosphorus compounds according to WO-A 98/17720 (=U.S. Pat. No. 6,538,024), e.g. triphenyl phosphate (TPP), resorcinol bis(diphenyl phosphate) (RDP) and the oligomers derived therefrom, and also bisphenol A bis(diphenyl phosphate) (BDP) and the oligomers derived therefrom, and moreover organic and inorganic phosphonic acid derivatives and their salts, organic and inorganic phosphinic acid derivatives and their salts, in particular metal dialkylphosphinates, such as aluminium tris[dialkylphosphinates] or zinc bis[dialkylphosphinates], and moreover red phosphorus, phosphites, hypophosphites, phosphine oxides, phosphazenes, melamine pyrophosphate and mixtures of these. Nitrogen compounds that can be used are those from the group of the allantoin derivatives, cyanuric acid derivatives, dicyandiamide derivatives, glycoluril derivatives, guanidine derivatives, ammonium derivatives and melamine derivatives, preferably allantoin, benzoguanamine, glycoluril, melamine, condensates of melamine, e.g. melem, melam or melom, or compounds of this type having higher condensation level and adducts of melamine with acids, e.g. with cyanuric acid (melamine cyanurate), with phosphoric acid (melamine phosphate) or with condensed phosphoric acids (e.g. melamine polyphosphate). Examples of suitable synergists are antimony compounds, in particular antimony trioxide, sodium antimonate and antimony pentoxide, zinc compounds, e.g. zinc borate, zinc oxide, zinc phosphate and zinc sulphide, tin compounds, e.g. tin stannate and tin borate, and also magnesium compounds, e.g. magnesium oxide, magnesium carbonate and magnesium borate. Materials known as carbonizers can also be added to the flame retardant, examples being phenol-formaldehyde resins, polycarbonates, polyphenyl ethers, polyimides, polysulphones, polyether sulphones, polyphenylene sulphides, and polyether ketones, and also antidrip agents, such as tetrafluoroethylene polymers.

In another alternative preferred embodiment, the polymer moulding compositions to be used for the production of the lightweight components of hybrid design according to the invention can also, if appropriate, comprise, in addition to components A) and, if appropriate, B) and C) and/or D), or instead of B) and/or C) and/or D), E) from 0.001 to 80 parts by weight, particularly preferably from 2 to 19 parts by weight, with particular preference from 9 to 15 parts by weight, of at least one elastomer modifier.

The elastomer modifiers to be used as component E) comprise one or more graft polymers of E.1 from 5 to 95% by weight, preferably from 30 to 90% by weight, of at least one vinyl monomer on E.2 from 95 to 5% by weight, preferably from 70 to 10% by weight, of one or more graft bases whose glass transition temperatures are <10° C., preferably <0° C., particularly preferably <−20° C.

The average particle size ($d_{50}$ value) of the graft base E.2 is generally from 0.05 to 10 μm, preferably from 0.1 to 5 μm, particularly preferably from 0.2 to 1 μm.

Monomers E.1 are preferably mixtures composed of

E.1.1 from 50 to 99% by weight of vinylaromatics and/or ring-substituted vinylaromatics (such as styrene, α-methylstyrene, p-methylstyrene, p-chlorostyrene) and/or ($C_1$-$C_8$)-alkyl methacrylates (e.g. methyl methacrylate, ethyl methacrylate) and E.1.2 from 1 to 50% by weight of vinyl cyanides (unsaturated nitriles, such as acrylonitrile and methacrylonitrile) and/or ($C_1$-$C_8$)-alkyl(meth)acrylates (e.g. methyl methacrylate, n-butyl acrylate, tert-butyl acrylate) and/or derivatives (such as anhydrides and imides) of unsaturated carboxylic acids (e.g. maleic anhydride and N-phenylmaleimide).

Preferred monomers E.1.1 have been selected from at least one of the monomers styrene, α-methylstyrene and methyl methacrylate, and preferred monomers E.1.2 have been selected from at least one of the monomers acrylonitrile, maleic anhydride and methyl methacrylate.

Particularly preferred monomers are E.1.1 styrene and E.1.2 acrylonitrile.

Examples of suitable graft bases E.2 for the graft polymers to be used in the elastomer modifiers E) are diene rubbers, EP(D)M rubbers, i.e. rubbers based on ethylene/propylene and, if appropriate, diene, acrylate rubbers, polyurethane rubbers, silicone rubbers, chloroprene rubbers and ethylene-vinyl acetate rubbers.

Preferred graft bases E.2 are diene rubbers (e.g. based on butadiene, isoprene, etc.) or mixtures of diene rubbers, or are copolymers of diene rubbers or of their mixtures with further copolymerizable monomers (e.g. according to E.1.1 and E.1.2), with the proviso that the glass transition temperature of component E.2 is <10° C., preferably <0° C., particularly preferably <−10° C.

Examples of particularly preferred graft bases E.2 are ABS polymers (emulsion, bulk and suspension ABS), as described by way of example in DE-A 2 035 390 (=U.S. Pat. No. 3,644,574) or in DE-A 2 248 242 (=GB-A 1 409 275) or in Ullmann, Enzyklopädie der Technischen Chemie [Encyclopaedia of Industrial Chemistry], Vol. 19 (1980), pp. 280 et seq. The gel content of the graft base E.2 is preferably at least 30% by weight, particularly preferably at least 40% by weight (measured in toluene).

The elastomer modifiers or graft polymers E) are prepared via free-radical polymerization, e.g. via emulsion, suspension, solution or bulk polymerization, preferably via emulsion or bulk polymerization.

Other particularly suitable graft rubbers are ABS polymers which are prepared via redox initiation using an initiator system composed of organic hydroperoxide and ascorbic acid according to U.S. Pat. No. 4,937,285.

Because it is known that the graft monomers are not necessarily entirely grafted onto the graft base during the grafting reaction, products which are obtained via (co)polymerization of the graft monomers in the presence of the graft base and are produced concomitantly during the work-up are also graft polymers E) according to the invention.

Suitable acrylate rubbers are based on graft bases E.2 which are preferably polymers composed of alkyl acrylates, if appropriate with up to 40% by weight, based on E.2, of other polymerizable, ethylenically unsaturated monomers. Among the preferred polymerizable acrylic esters are $C_1$-$C_8$-alkyl esters, such as methyl, ethyl, butyl, n-octyl and 2-ethylhexyl esters; haloalkyl esters, preferably halo-$C_1$-$C_8$-alkyl esters, such as chloroethyl acrylate, and also mixtures of these monomers.

For crosslinking, monomers having more than one polymerizable double bond can be copolymerized. Preferred examples of crosslinking monomers are esters of unsaturated monocarboxylic acids having from 3 to 8 carbon atoms and esters of unsaturated monohydric alcohols having from 3 to 12 carbon atoms, or of saturated polyols having from 2 to 4 OH groups and from 2 to 20 carbon atoms, e.g. ethylene glycol dimethacrylate, allyl methacrylate; polyunsaturated heterocyclic compounds, e.g. trivinyl and triallyl cyanurate; polyfunctional vinyl compounds, such as di- and trivinylbenzenes; and also triallyl phosphate and diallyl phthalate.

Preferred crosslinking monomers are allyl methacrylate, ethylene glycol dimethacrylate, diallyl phthalate and heterocyclic compounds which have at least 3 ethylenically unsaturated groups.

Particularly preferred crosslinking monomers are the cyclic monomers triallyl cyanurate, triallyl isocyanurate, triacryloylhexahydro-s-triazine, and triallylbenzenes. The amount of the crosslinking monomers is preferably from 0.02 to 5% by weight, in particular from 0.05 to 2% by weight, based on the graft base E.2.

In the case of cyclic crosslinking monomers having at least 3 ethylenically unsaturated groups, it is advantageous to restrict the amount to below 1% by weight of the graft base E.2.

Examples of preferred "other" polymerizable, ethylenically unsaturated monomers which can serve alongside the acrylic esters, if appropriate, for preparation of the graft base E.2 are acrylonitrile, styrene, α-methylstyrene, acrylamides, vinyl $C_1$-$C_6$-alkyl ethers, methyl methacrylate, butadiene. Acrylate rubbers preferred as graft base E.2 are emulsion polymers whose gel content is at least 60% by weight.

Further suitable graft bases according to E.2 are silicone rubbers having sites active for grafting purposes, as described in DE-A 3 704 657 (=U.S. Pat. No. 4,859,740), DE-A 3 704 655 (=U.S. Pat. No. 4,861,831), DE-A 3 631 540 (=U.S. Pat. No. 4,806,593) and DE-A 3 631 539 (=U.S. Pat. No. 4,812, 515).

Alongside elastomer modifiers based on graft polymers, it is also possible to use, as component E), elastomer modifiers not based on graft polymers but having glass transition temperatures <10° C., preferably <0° C., particularly preferably <−20° C. Among these can be, by way of example, elastomers with block copolymer structure. Among these can also be, by way of example, elastomers which can undergo thermoplastic melting. Preferred materials mentioned here by way of example are EPM rubbers, EPDM rubbers and/or SEBS rubbers.

In another alternative preferred embodiment, the polymer moulding compositions to be used for the production of the lightweight components of hybrid design according to the invention can also, if appropriate, comprise, in addition to components A) and, if appropriate, B) and/or C) and/or D) and/or E), or instead of B), C), D) or E), F) from 0.001 to 10 parts by weight, preferably from 0.05 to 3 parts by weight, particularly preferably from 0.1 to 0.9 part by weight, of further conventional additives.

For the purposes of the present invention, examples of conventional additives are stabilizers (e.g. UV stabilizers, heat stabilizers, gamma-ray stabilizers), antistatic agents, flow aids, mould-release agents, further fire-protection additives, emulsifiers, nucleating agents, plasticizers, lubricants, dyes, pigments and additives for increasing electrical conductivity. The additives mentioned and further suitable additives are described by way of example in Gächter, Müller, Kunststoff-Additive [Plastics Additives], 3rd Edition, Hanser-Verlag, Munich, Vienna, 1989 and in Plastics Additives Handbook, 5th Edition, Hanser-Verlag, Munich, 2001. The additives may be used alone or in a mixture, or in the form of masterbatches.

Preferred stabilizers used are sterically hindered phenols, hydroquinones, aromatic secondary amines, e.g. diphenylamines, substituted resorcinols, salicylates, benzotriazoles and benzophenones, and also various substituted representatives of these groups and mixtures thereof.

Preferred pigments and dyes used are titanium dioxide, zinc sulphide, ultramarine blue, iron oxide, carbon black, phthalocyanines, quinacridones, perylenes, nigrosin and anthraquinones.

Preferred nucleating agents used are sodium phenylphosphinate or calcium phenylphosphinate, aluminium oxide, silicon dioxide, or else talc, particularly preferably talc.

Preferred lubricants and mould-release agents used are ester waxes, pentaerythritol tetrastearate (PETS), long-chain fatty acids (e.g. stearic acid or behenic acid) and fatty acid esters, salts thereof (e.g. Ca stearate or Zn stearate), and also amide derivatives (e.g. ethylenebisstearylamide) or montan waxes (mixtures composed of straight-chain, saturated carboxylic acids having chain lengths of from 28 to 32 carbon atoms), and also low-molecular-weight polyethylene waxes and polypropylene waxes.

Preferred plasticizers used are dioctyl phthalate, dibenzyl phthalate, butyl benzyl phthalate, hydrocarbon oils, N-(n-butyl)benzenesulphonamide.

Preferred additives which can be added to increase electrical conductivity are carbon blacks, conductivity blacks, carbon fibrils, nanoscale graphite fibres and carbon fibres, graphite, conductive polymers, metal fibres, and also other conventional additives for increasing electrical conductivity. Nanoscale fibres which can preferably be used are those known as "single-wall carbon nanotubes" or "multiwall carbon nanotubes" (e.g. from Hyperion Catalysis).

In another alternative preferred embodiment, the polyamide moulding compositions can also, if appropriate, comprise, in addition to components A) and, if appropriate, B) and/or C), and/or D), and/or E), and/or F), or instead of B), C), D), E) or F), G) from 0.5 to 30 parts by weight, preferably from 1 to 20 parts by weight, particularly preferably from 2 to 10 parts by weight and most preferably from 3 to 7 parts by weight, of compatibilizer.

Compatibilizers used preferably comprise thermoplastic polymers having polar groups.

According to the invention, polymers which can be used are therefore those which contain G.1 a vinylaromatic monomer, G.2 at least one monomer selected from the group of $C_2$-$C_{12}$-alkyl methacrylates, $C_2$-$C_{12}$-alkyl acrylates, methacrylonitriles and acrylonitriles and G.3 dicarboxylic anhydrides containing α,β-unsaturated components.

The component used composed of G.1, G.2 and G.3 preferably comprises terpolymers of the monomers mentioned. Accordingly, it is preferable to use terpolymers of styrene, acrylonitrile and maleic anhydride. In particular, these terpolymers contribute to improvement in mechanical properties, such as tensile strength and tensile strain at break. The amount of maleic anhydride in the terpolymer can vary widely. The amount is preferably from 0.2 to 5 mol %. Amounts of from 0.5 to 1.5 mol % are particularly preferred. In this range, particularly good mechanical properties are achieved in relation to tensile strength and tensile strain at break.

The terpolymer can be prepared in a known manner. One suitable method is to dissolve monomer components of the terpolymer, e.g. styrene, maleic anhydride or acrylonitrile, in a suitable solvent, e.g. methyl ethyl ketone (MEK). One or, if appropriate, more chemical initiators are added to this solution. Preferred initiators are peroxides. The mixture is then polymerized at elevated temperatures for a number of hours. The solvent and the unreacted monomers are then removed in a manner known per se.

The ratio of component G.1 (vinylaromatic monomer) to component G.2, e.g. the acrylonitrile monomer in the terpolymer is preferably from 80:20 to 50:50.

Styrene is particularly preferred as vinylaromatic monomer G.1. Acrylonitrile is particularly preferably suitable for component G.2. Maleic anhydride is particularly preferably suitable as component G.3.

EP-A 0 785 234 (=U.S. Pat. No. 5,756,576) and EP-A 0 202 214 (=U.S. Pat. No. 4,713,415) describe examples of compatibilizers G) which can be used according to the invention. According to the invention, particular preference is given to the polymers mentioned in EP-A 0 785 234.

The compatibilizers can be present in component G) alone or in any desired mixture with one another.

Another substance particularly preferred as compatibilizer is a terpolymer of styrene and acyrlonitrile in a ratio of 2.1:1 by weight containing 1 mol % of maleic anhydride.

Component G) is used particularly when the moulding composition comprises graft polymers, as described under E).

According to the invention, the following combinations of the components are preferred in polymer moulding compositions for use in hybrid-based lightweight components:
A; A,B; A,B,C; A,B,D; A,B,E; A,B,F; A,B,G; A,B,C,D; A,B,C,E; A,B,C,F; A,B,C,G; A,B,D,E; A,B,D,F; A,B,D,G; A,B,E,F; A,B,E,G; A,B,F,G; A,B,C,D,E; A,B,C,D,G; A,B,C,F,G; A,B,E,F,G; A,B,D,F,G; A,B,C,D,E,F; A,B,C,D,E,G; A,B,D,E,F,G; A,B,C,E,F,G; A,B,C,D,E,G; A,B,C,D,E,F,G.

The lightweight components of hybrid design to be produced according to the invention from the polymer moulding compositions used feature an exceptionally secure connection of the galvanized iron parent body to the thermoplastic. They also have high impact resistance and an unusually high modulus of elasticity of about 19 000 MPa at room temperature. In the event that polyamide is used in combination, for example, with a component B1), the content of glass fibres can be doubled from 30% by weight to 60% by weight, leading to doubled stiffness of a lightweight component of hybrid design produced therefrom. Surprisingly, the density of the polymer moulding composition increases by only about 15-20% here. This permits a significant reduction of the wall thicknesses of the components for the same mechanical performance, with markedly reduced manufacturing costs. Motor-vehicle front ends, a standard application of hybrid technology, can thus be designed to be lighter and/or stiffer, and this is attended by a reduction of 30-40% in weight and in manufacturing costs, in comparison with a component manufactured conventionally.

Lightweight components of hybrid design to be produced according to the invention using flow improver B) and composed of a galvanized iron parent body whose exterior or interior, in the event of use of a shell-type parent body, has reinforcing structures, preferably in the form of ribs, securely connected to the parent body and composed of moulded-on thermoplastic, where the connection of these to the parent body is achieved at discrete connection sites by way of perforations in the parent body can therefore be used in the automotive and non-automotive sectors, preferably as vehicle parts (automotive sector), in load-bearing parts of office machinery, household machines or other machinery, in design elements for decorative purposes, in staircases, in escalator steps, or in manhole covers.

They are preferably used in motor vehicles as roof structures, composed by way of example of roof frames, roof arch and/or rooftop elements, or for column structures, e.g. A-, B- and/or C-column, for chassis structures, composed by way of example of steering stub, coupling rod, wishbone and/or stabilizers, or for longitudinal-member structures, for example composed of longitudinal member and/or door sill, or for front-end structures, for example composed of front ends, front-end module, headlamp frame, lock member, transverse member, radiator member and/or assembly support, or for pedal structures, for example composed of brake pedal, accelerator pedal and clutch pedal, pedal block and/or pedal module, or for door structures and flap structures, for example front and rear driver and passenger doors, tailgates and/or engine hood, or for instrument-panel-support structures, for example composed of transverse member, instrument-panel member and/or cockpit member, for oil sumps, for example transmission-oil sumps and/or oil modules, or for seat structures, for example composed of seat-backrest structure, backrest structure, seat-pan structure, belt cross-tie and/or arm rests, or in the form of complete front ends, pedestrian-protection beam, specialized slam panels for engine hoods or luggage-compartment lids, front roof arch, rear roof arch, roof frame, roof modules (entire roof), sliding-roof-support parts, dashboard support parts (cross car beam), steering-column retainers, firewall, pedals, pedal blocks, gear-shift blocks, A-columns, B-columns, or C-columns, B-column modules, longitudinal members, jointing elements for the connection of longitudinal members and B-columns, jointing elements for the connection of A-column and transverse member, jointing elements for the connection of A-column, transverse member and longitudinal member, transverse members, wheel surrounds, wheel-surround modules, crash boxes, rear ends, spare-wheel recesses, engine hoods, engine covers, water-tank assembly, engine-rigidity systems (front-end rigidity system), vehicle floor, floor-rigidity systems, seat-rigidity system, transverse seat members, tailgates, vehicle frames, seat structures, back-rests, seat shells, seat back-rests with or without safety-belt integration, parcel shelves, valve covers, end-shields for generators or electric motors, complete vehicle-door structures, side-impact members, module members, oil sumps, gearbox-oil sumps, oil modules, headlamp frames, door sills, door-sill reinforcement, chassis components and motor-scooter frames.

In the non-automotive sector, the lightweight components of hybrid design according to the invention are preferably used in electrical and electronics equipment, household equipment, furniture, heaters, shopping trolleys, shelving, staircases, escalator steps, or manhole covers.

However, the lightweight components of hybrid design according to the invention are, of course, also suitable for use in rail vehicles, aircraft, ships, sleds, motor scooters or other means of conveyance, where lightweight but stable designs are important.

However, the present invention also provides a process for the production of a lightweight component of hybrid design composed of a parent body which has reinforcing structures and which is composed of galvanized iron, where the reinforcing structures have been securely connected to the parent body and are composed of moulded-on thermoplastic, characterized in that the thermoplastic used comprises polymer moulding compositions based on polyamide, and these comprise from 99.99 to 10 parts by weight, preferably from 99.5 to 40 parts by weight, particularly preferably from 99.0 to 55 parts by weight, of at least one aliphatic, semicrystalline, thermoplastic polyamide, and the secure interlock connection between parent body and thermoplastic is achieved by shaping processes in a shaping mould, by way of the galvanized iron surface of the parent body.

In one preferred embodiment, the present invention provides a process for the production of a lightweight component of hybrid design composed of a parent body which has reinforcing structures and which is composed of galvanized iron, where the reinforcing structures have been securely connected to the parent body and are composed of moulded-on thermoplastic, characterized in that the polyamides to be used comprise nylon-6 (PA 6) or nylon-6,6 (PA 66) with relative solution viscosities of from 2.0 to 4.0 (measured in m-cresol at 25° C.), and particularly preferably nylon-6 with a relative solution viscosity of from 2.3 to 2.6 (measured in m-cresol at 25° C.), or a mixture composed of A) from 99.99 to 10 parts by weight, preferably from 99.5 to 40 parts by weight, particularly preferably from 99.0 to 55 parts by weight, of polyamide, with at least one component B) from 0.01 to 50 parts by weight, preferably from 0.25 to 20 parts by weight, particularly preferably from 1.0 to 15 parts by weight, of an additional flow improver from the group of B1) a copolymer composed of at least one olefin, preferably an α-olefin, with at least one methacrylate or acrylate of an aliphatic alcohol, preferably of an aliphatic alcohol having from 1 to 30 carbon atoms, with MFI of not less than 100 g/10 min, the MFI (melt flow index) being measured or determined at 190° C. using a test weight of 2.16 kg, or B2) a highly branched or hyperbranched polycarbonate with an OH number of from 1 to 600 mg KOH/g of polycarbonate (to DIN 53240, Part 2), or B3) a highly branched or hyperbranched polyester of $A_xB_y$ type, where x is at least 1.1 and y is at least 2.1, or B4) a polyalkylene glycol ester (PAGE) with low molecular weight of the general formula (I)

$$R-COO-(Z-O)_n OC-R \quad (I)$$

in which

R is a branched or straight-chain alkyl group having from 1 to 20 carbon atoms,

Z is a branched or straight-chain $C_2$ to $C_{15}$ alkylene group, and n is a whole number from 2 to 20, or a mixture of B1) with B2) or of B2) with B3) or of B1) with B3) or of B1) with B2) and with B3) or of B1) with B4) or of B2) with B4) or of B3) with B4) or a ternary mixture of components B1) to B4), in each case with A), where the secure interlock connection between parent body and thermoplastic is achieved by way of the galvanized iron surface of the parent body, and the secure interlock connection between parent body and thermoplastic is achieved by way of the galvanized surface of the parent body, after pretreatment by a process from the group of acid treatment, soda treatment, amine treatment, anodic treatment, base treatment or laser treatment, by shaping processes in a shaping mould.

However, the present invention also provides a method for reducing the weight of components, preferably of vehicles of any type, characterized in that lightweight components of hybrid design composed of a parent body which has reinforcing structures and which is composed of galvanized iron, the surface of which has been pretreated by a process from the group of acid treatment, soda treatment, amine treatment, anodic treatment, base treatment or laser treatment, where the reinforcing structures have been securely connected to the parent body and are composed of moulded-on thermoplastic, and the thermoplastic used comprises moulding compositions comprising from 99.99 to 10 parts by weight, preferably from 99.5 to 40 parts by weight, particularly preferably from 99.0 to 55 parts by weight, of at least one aliphatic, semicrystalline, thermoplastic polyamide.

In one preferred embodiment, the present invention provides a method for reducing the weight of components, preferably of vehicles of any type, characterized in that lightweight components of hybrid design composed of a parent body which has reinforcing structures and which is composed of galvanized iron, the surface of which has been pretreated by a process from the group of acid treatment, soda treatment, amine treatment, anodic treatment, base treatment or laser treatment, where the reinforcing structures have been securely connected to the parent body and are composed of moulded-on thermoplastic, and the thermoplastic used comprises moulding compositions comprising polyamide, preferably nylon-6 (PA 6) or nylon-6,6 (PA 66) with relative solution viscosities of from 2.0 to 4.0 (measured in m-cresol at 25° C.), and particularly preferably nylon-6 with a relative solution viscosity of from 2.3 to 2.6 (measured in m-cresol at 25° C.), or a mixture composed of A) from 99.99 to 10 parts by weight, preferably from 99.5 to 40 parts by weight, particularly preferably from 99.0 to 55 parts by weight, of polyamide, with at least one component B) from 0.01 to 50 parts by weight, preferably from 0.25 to 20 parts by weight, particularly preferably from 1.0 to 15 parts by weight, of a flow improver from the group of B1) a copolymer composed of at least one olefin, preferably an α-olefin, with at least one methacrylate or acrylate of an aliphatic alcohol, preferably of an aliphatic alcohol having from 1 to 30 carbon atoms, with MFI of not less than 100 g/10 min, the MFI (melt flow index) being measured or determined at 190° C. using a test weight of 2.16 kg, or B2) a highly branched or hyperbranched polycarbonate with an OH number of from 1 to 600 mg KOH/g of polycarbonate (to DIN 53240, Part 2), or B3) a highly branched or hyperbranched polyester of $A_xB_y$ type, where x is at least 1.1 and y is at least 2.1, or B4) a polyalkylene glycol ester (PAGE) with low molecular weight of the general formula (I)

$$R-COO-(Z-O)_nOC-R \qquad (I)$$

in which
R is a branched or straight-chain alkyl group having from 1 to 20 carbon atoms,
Z is a branched or straight-chain $C_2$ to $C_{15}$ alkylene group, and
n is a whole number from 2 to 20, or
a mixture of B1) with B2) or of B2) with B3) or of B1) with B3) or of B1) with B2) and with B3) or of B1) with B4) or of B2) with B4) or of B3) with B4) or a ternary mixture of components B1) to B4), in each case with A), where the secure interlock connection between parent body and thermoplastic is achieved by way of the galvanized iron surface of the parent body.

For the purposes of the present invention, a secure interlock connection means that the extruded polymer is securely connected to the galvanized iron parent body by way of microstructures in the surface of the same, and that there is no free movement within the said secure interlock connection, and that the cross section of the interlock connection has to be disrupted under load before the connected subsections composed firstly of metal and secondly of injected thermoplastic can be separated from one another.

In one preferred embodiment, the said interlock connection is also promoted or enhanced by openings in the parent body, in that the thermoplastic is forced through these and flows out on the opposite side of the openings by way of the edges of the openings, thus giving a secure interlock connection on solidification. In one particularly preferred embodiment it is also possible, however that the flash material protruding by way of the openings is subjected to mechanical working with a tool in an additional operation, in such a way as to provide further enhancement of the interlock connection. In another meaning of the term "securely connected", (an) item(s) is/are subsequently bonded in place by use of adhesives or by use of a laser. However, it is also possible to achieve the secure interlock connection by a process involving flow around (producing a web around) the parent body.

However, the present invention also provides vehicles or other means of conveyance, preferably motor vehicles, rail vehicles, aircrafts, ships, sleds or motor scooters, comprising a lightweight component of hybrid design composed of a parent body composed of galvanized iron with moulded-on thermoplastic, characterized in that the polymer moulding compositions used comprise polyamide as thermoplastic, and the said lightweight component is installed within the vehicle.

The present invention preferably provides vehicles or other means of conveyance, characterized in that the thermoplastic used for the lightweight component comprises nylon-6 (PA 6) or nylon-6,6 (PA 66) with relative solution viscosities of from 2.0 to 4.0 (measured in m-cresol at 25° C.), and particularly preferably nylon-6 with a relative solution viscosity of from 2.3 to 2.6 (measured in m-cresol at 25° C.), or a mixture composed of
A) from 99.99 to 10 parts by weight, preferably from 99.5 to 40 parts by weight, particularly preferably from 99.0 to 55 parts by weight, of polyamide, with at least one component
B) from 0.01 to 50 parts by weight, preferably from 0.25 to 20 parts by weight, particularly preferably from 1.0 to 15 parts by weight, of an additional flow improver from the group of
B1) a copolymer composed of at least one olefin, preferably an α-olefin, with at least one methacrylate or acrylate of an aliphatic alcohol, preferably of an aliphatic alcohol having from 1 to 30 carbon atoms, with MFI of not less than 100 g/10 min, the MFI (melt flow index) being measured or determined at 190° C. using a test weight of 2.16 kg, or
B2) a highly branched or hyperbranched polycarbonate with an OH number of from 1 to 600 mg KOH/g of polycarbonate (to DIN 53240, Part 2), or
B3) a highly branched or hyperbranched polyester of $A_xB_y$ type, where x is at least 1.1 and y is at least 2.1, or
B4) a polyalkylene glycol ester (PAGE) with low molecular weight of the general formula (I)

$$R-COO-(Z-O)_nOC-R \qquad (I)$$

in which
R is a branched or straight-chain alkyl group having from 1 to 20 carbon atoms,
Z is a branched or straight-chain $C_2$ to $C_{15}$ alkylene group, and
n is a whole number from 2 to 20, or
a mixture of B1) with B2) or of B2) with B3) or of B1) with B3) or of B1) with B2) and with B3) or of B1) with B4) or of B2) with B4) or of B3) with B4) or a ternary mixture of components B1) to B4), in each case with A), where the secure interlock connection between parent body and thermoplastic is achieved by way of the galvanized iron surface of the parent body, the surface of which has been pretreated by a process from the group of acid treatment, soda treatment, amine treatment, anodic treatment, base treatment or laser treatment, and this lightweight component is installed within the vehicle.

It will be understood that the specification and examples are illustrative but not limitative of the present invention and that other embodiments within the spirit and scope of the invention will suggest themselves to those skilled in the art.

EXAMPLES

Lightweight components to be produced according to the invention and based on a parent body composed of galvanized iron sheet were produced using
a) linear nylon-6 (Durethan® B29, product commercially available from Lanxess Deutschland GmbH, Leverkusen, Germany) with a relative solution viscosity of 2.9 (measured in m-cresol at 25° C.)
b) linear nylon-6 (Durethan® B24, product commercially available from Lanxess Deutschland GmbH, Leverkusen, Germany) with a relative solution viscosity of 2.4 (measured in m-cresol at 25° C.)
c) linear nylon-6,6 (Radipol® A45H, product commercially available from Radici, Italy) with a relative solution viscosity of 3.0 (measured in m-cresol at 25° C.).

FIG. 13 shows seat structures according to the invention, in which h' is a sheet-metal profile to be inserted and i' is a plastics-geometry/rib structure to be moulded on.

Figure 1:
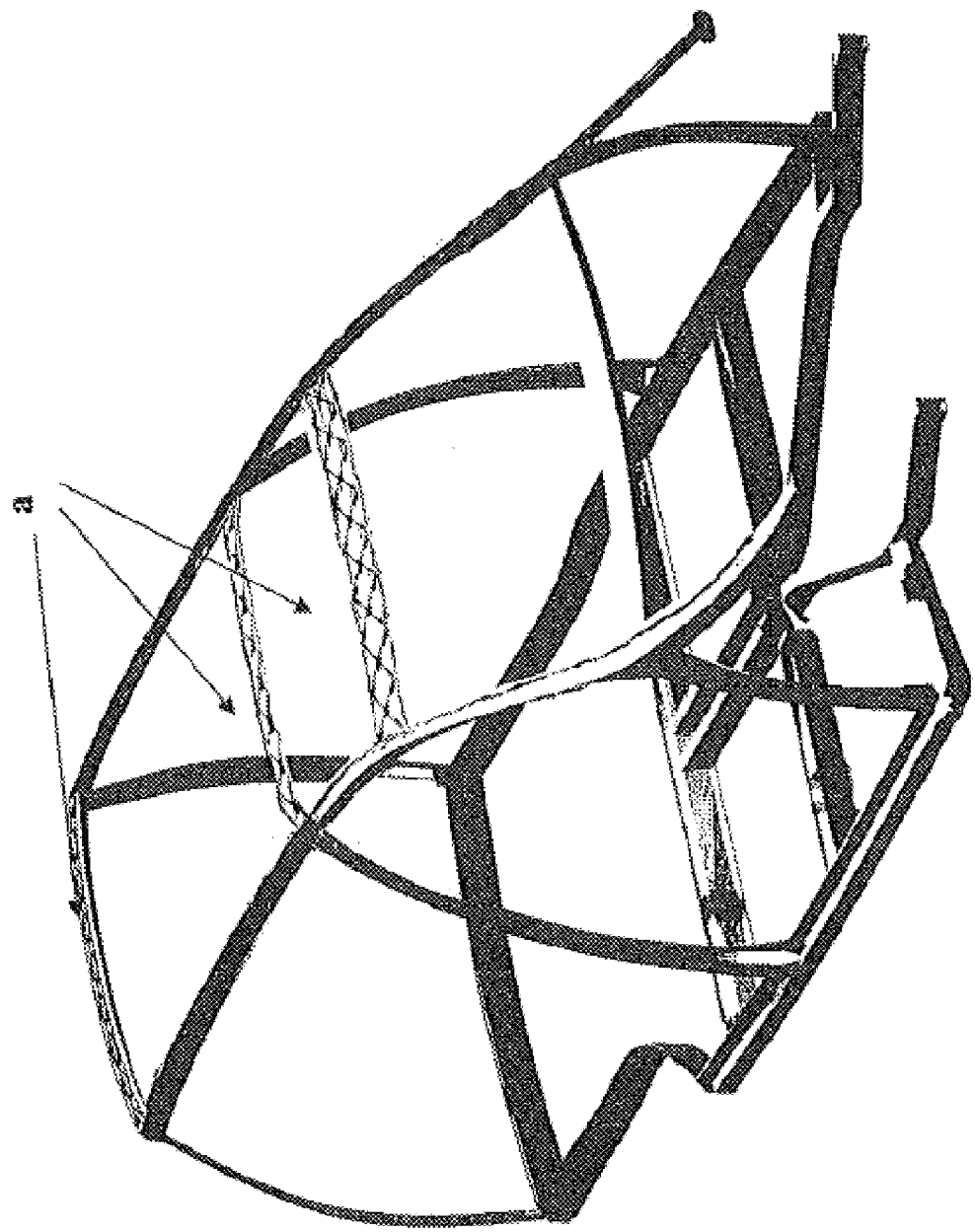
FIG. 1 shows a roof structure according to the invention, in which a are sheet metal profiles with moulded-on rib structure.
Figure 2:
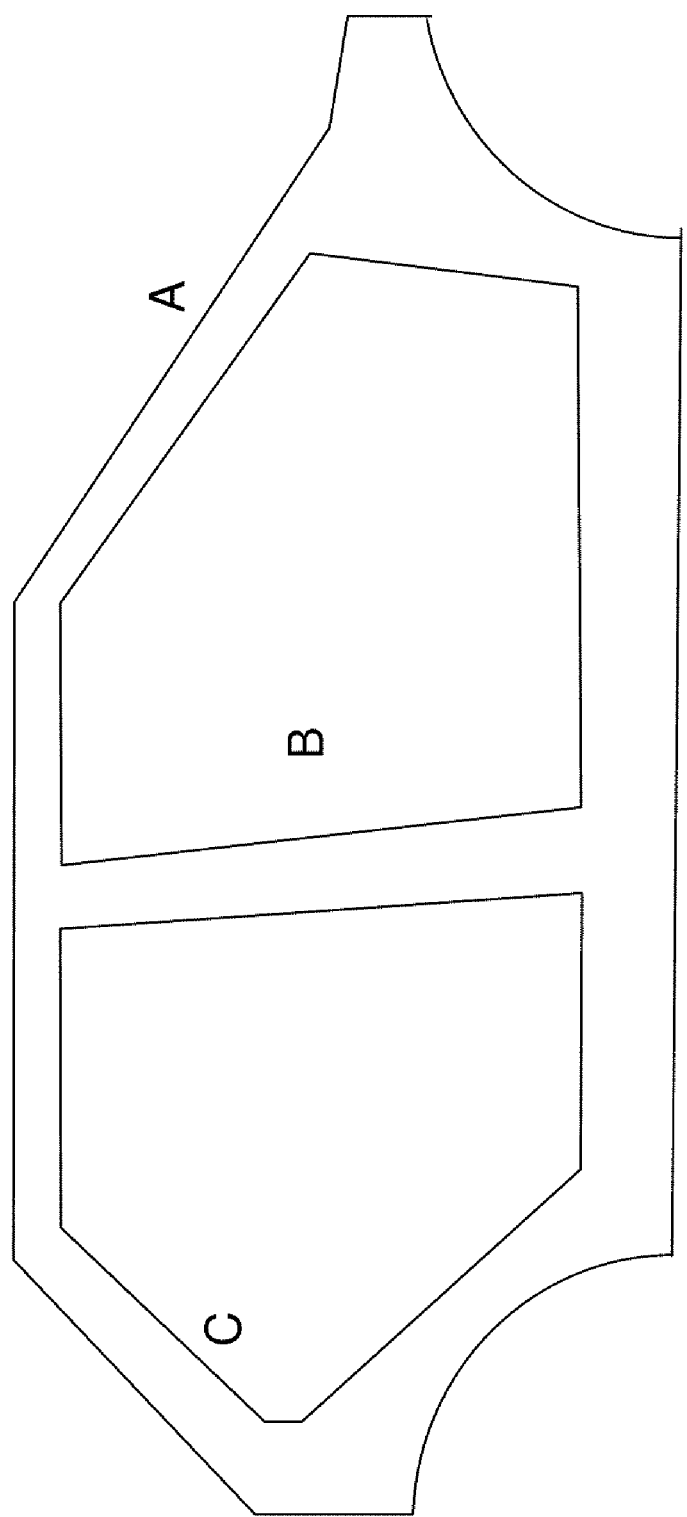
FIG. 2 shows a column structure according to the invention for a vehicle, in which A is the A-column, B is the B-column and C is the C-column.
Figure 3:
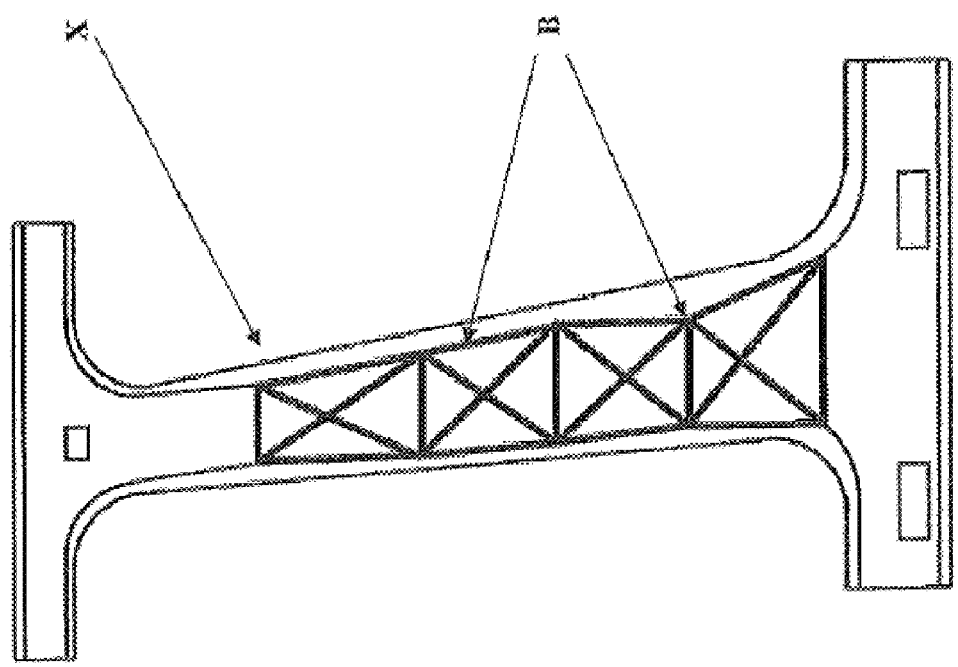
FIG. 3 shows a B-column (B) according to the invention, the inner metal sheet of which has been reinforced with moulded-on plastic in a rib structure. X indicates possible spot weld positions.
Figure 4:
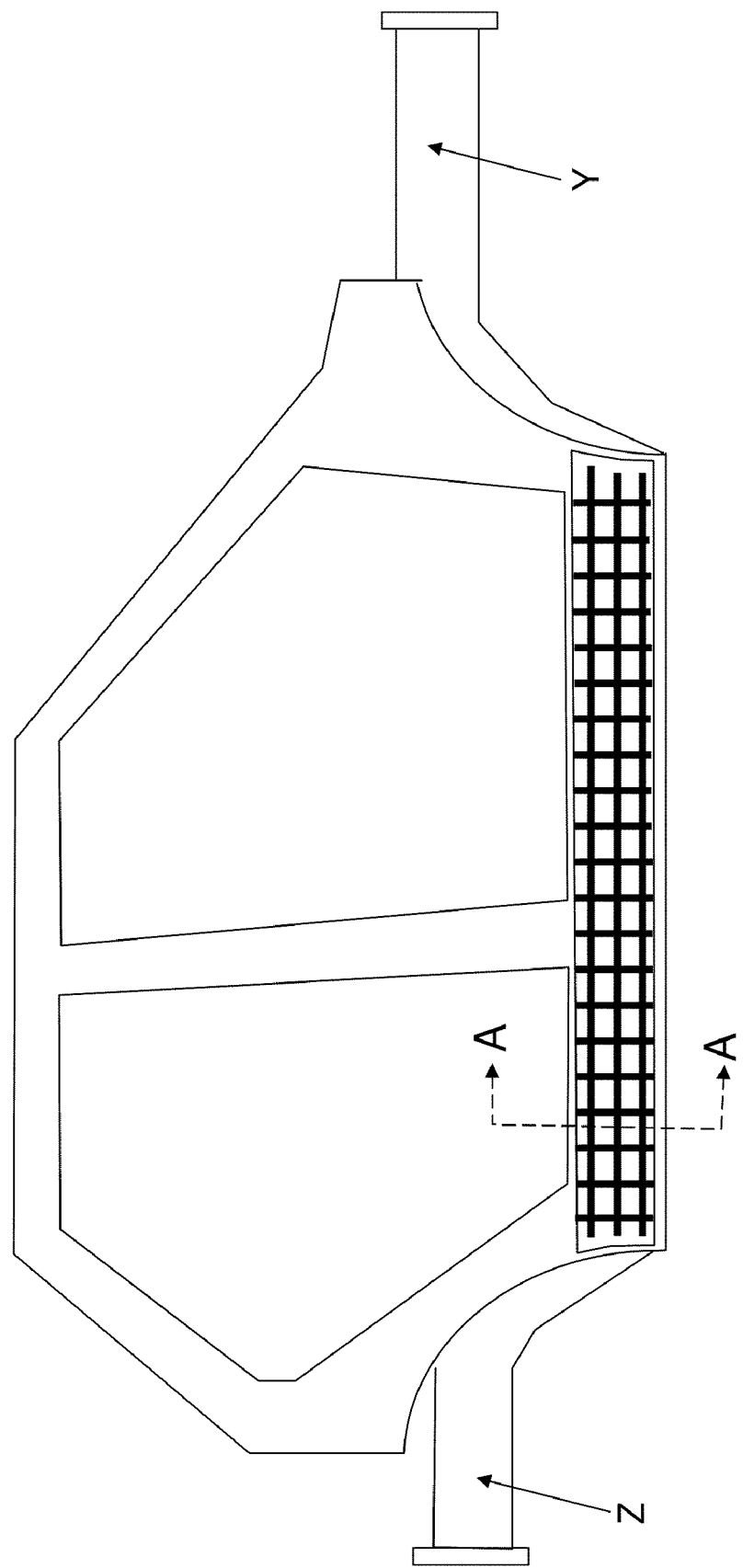
FIG. 4 shows a door sill structure according to the invention for a motor vehicle with Y longitudinal member at the front and Z longitudinal member at the rear. A indicates a section shown in FIG. 5.
Figure 5:
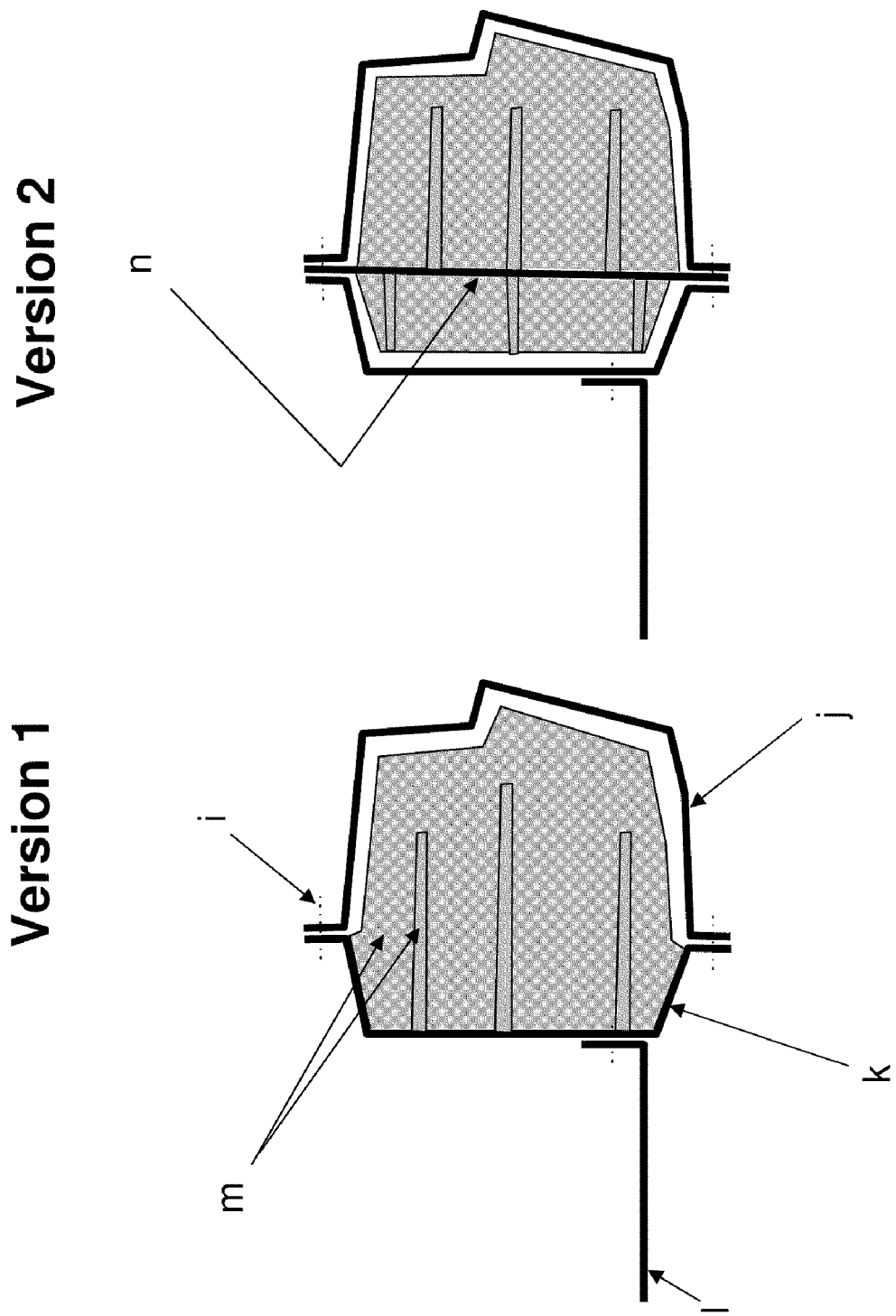
FIG. 5 shows a door sill according to FIG. 4 in the form of a sectional detail A-A, in which i is a welded connection, j is the exterior metal sheet of the door sill and k is the interior metal sheet of the door sill, 1 is the underbody metal sheet of a motor vehicle and m is a plastics rib structure moulded onto the interior metal sheet of the door sill.
Figure 6:
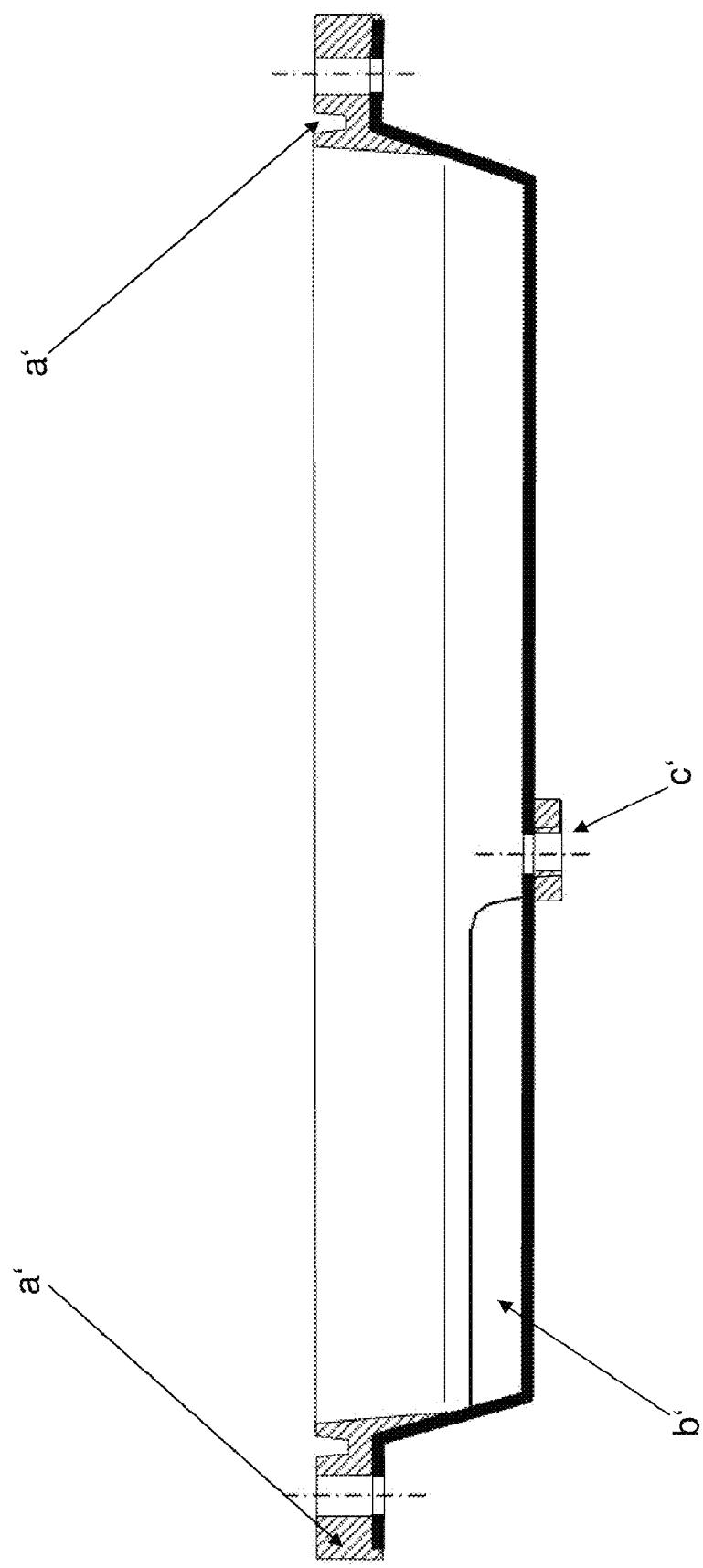
FIG. 6 shows an oil sump of a motor vehicle with a' moulded-on flanges with holes for screw threads and with peripheral sealing groove, b' moulded-on plastics ribs on the metal sheet, and c' a moulded-on screw thread for screw fixtures for oil-discharge.
Figure 7:
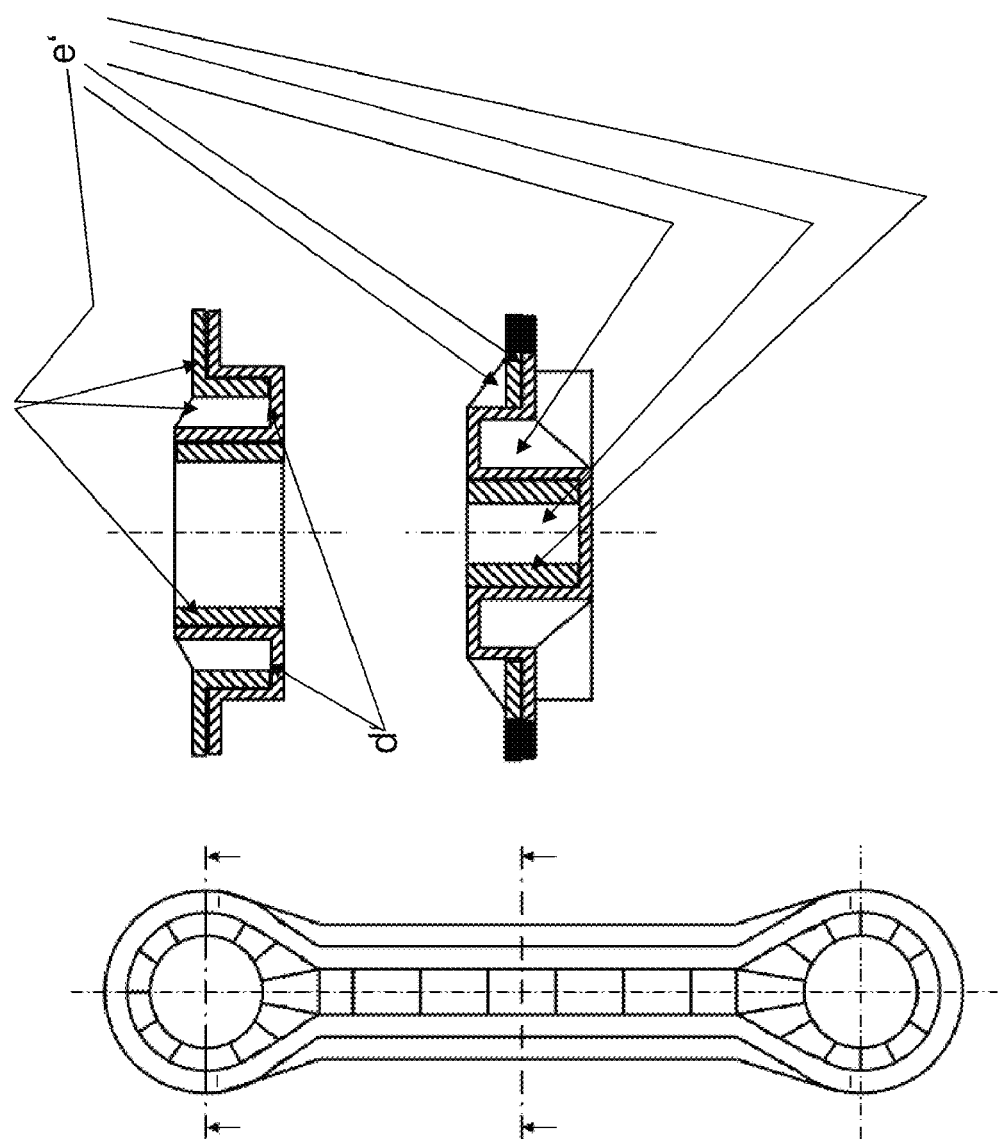
FIG. 7 shows a chassis structure according to the invention with d' a metal sheet, e' being a stabilizer insert using moulded-on-plastics geometry, on the metal sheet.
Figure 8:
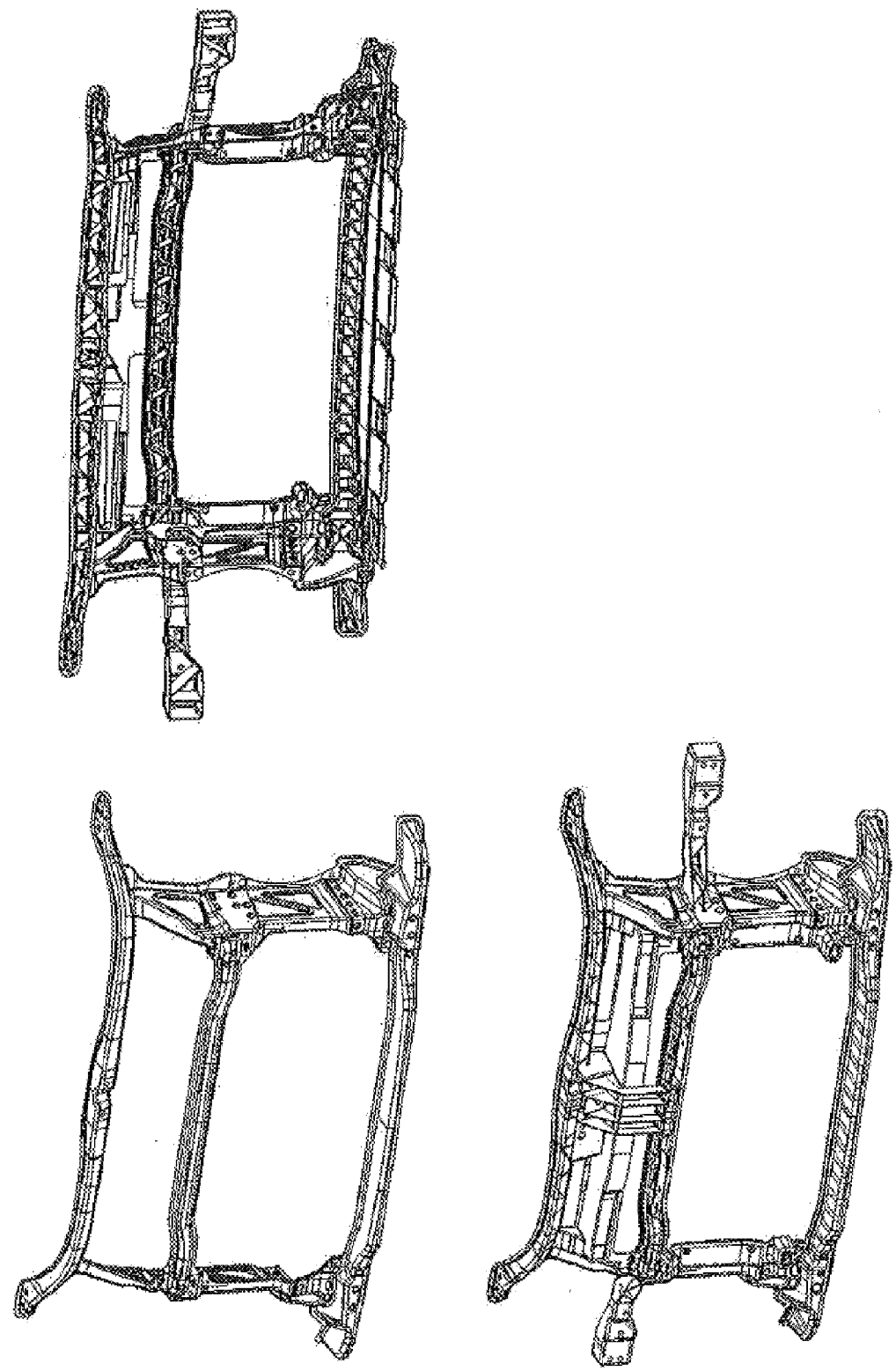
FIG. 8 shows three front-end structures according to the invention, composed of sheet-metal profiles overmoulded with plastic. The rib structure of the plastics parts is clearly discernible.
Figure 9:
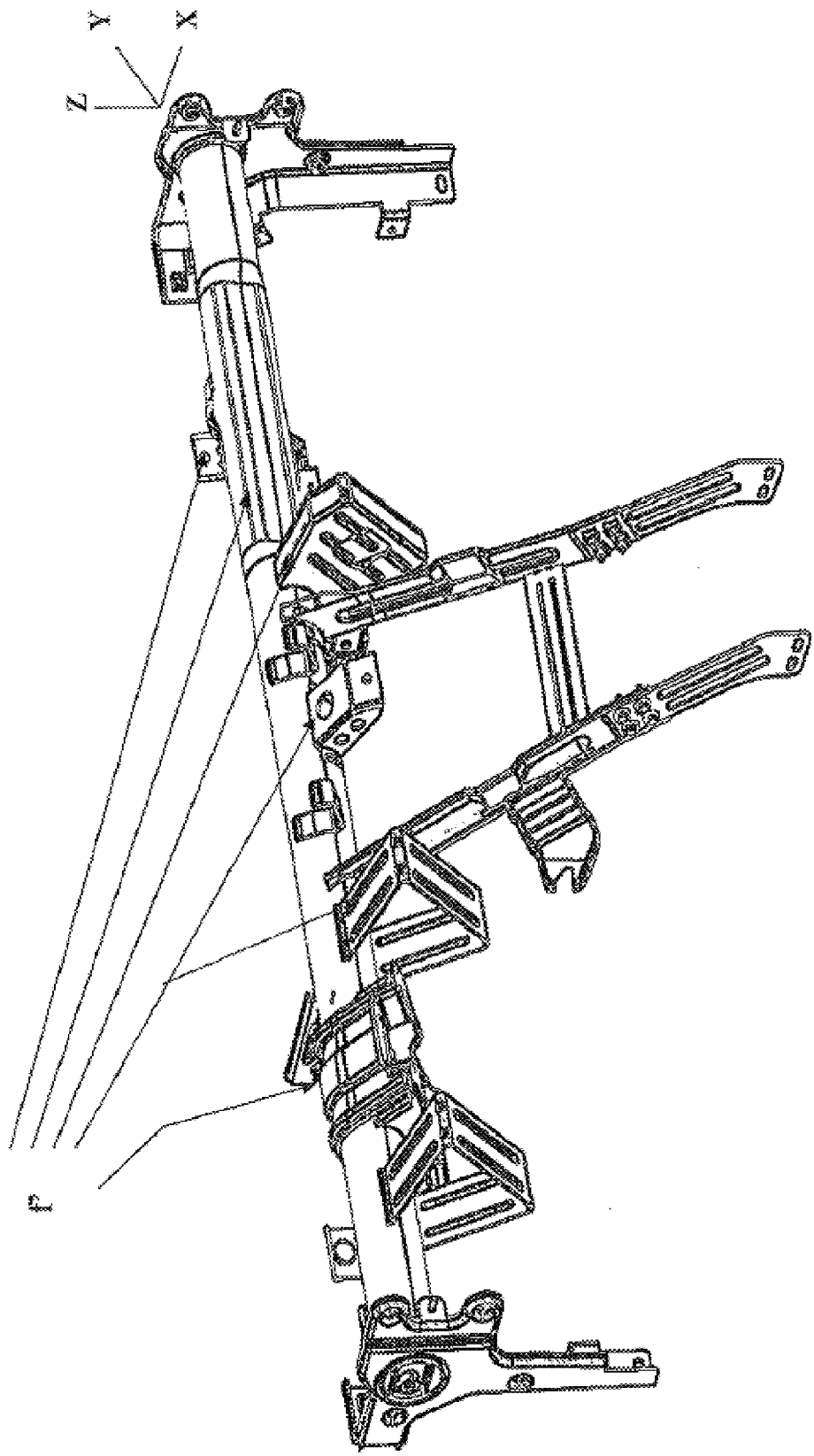
FIG. 9 shows an instrument-panel-support structure according to the invention, in which f' is a closed sheet-metal profile with moulded-on retainers and fastening points.
Figure 10:
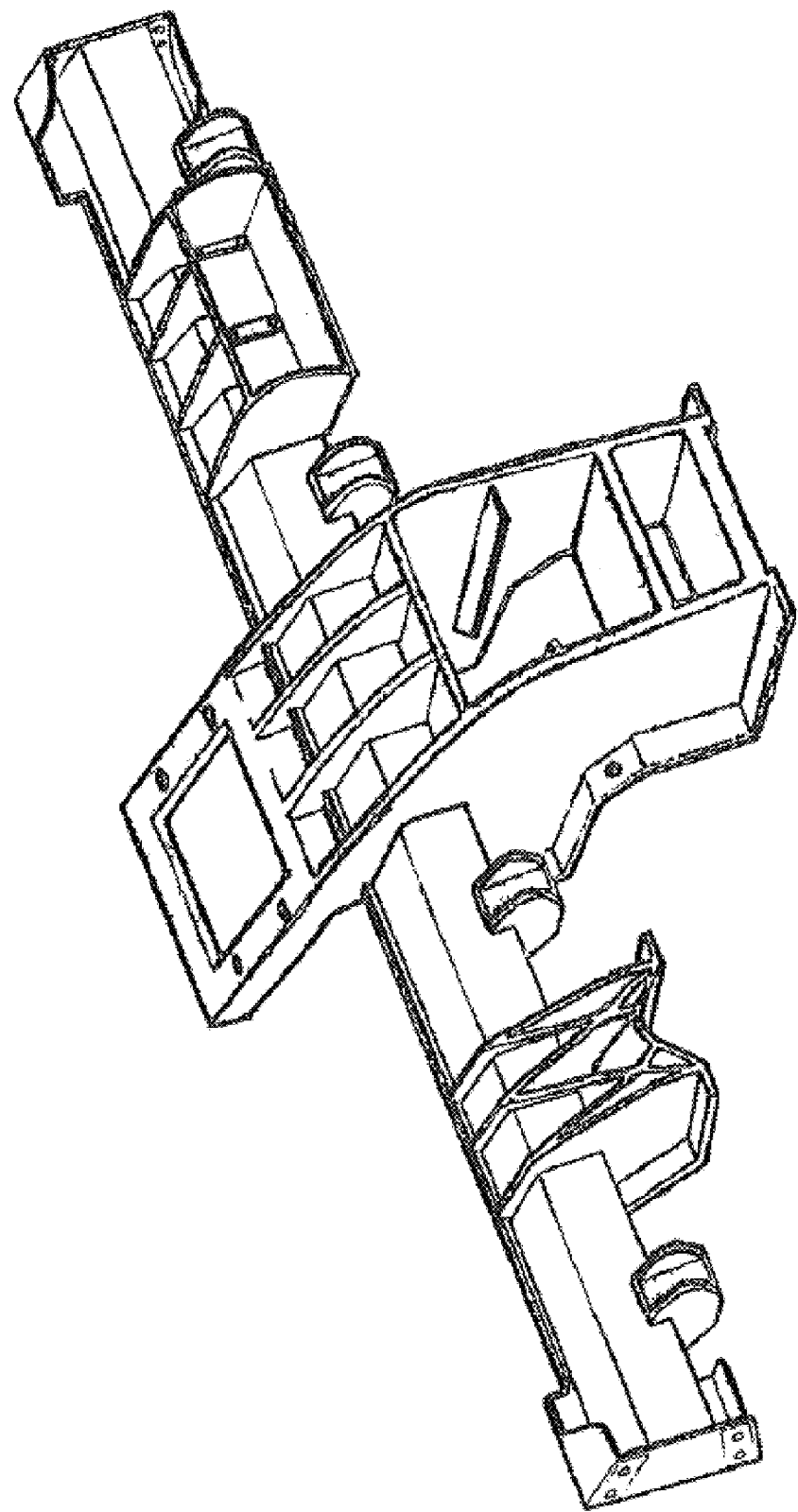
FIG. 10 shows an open-shell sheet-metal profile according to the invention for an instrument-panel support or CCB with moulded-on retainers and fastening points.
Figure 11:
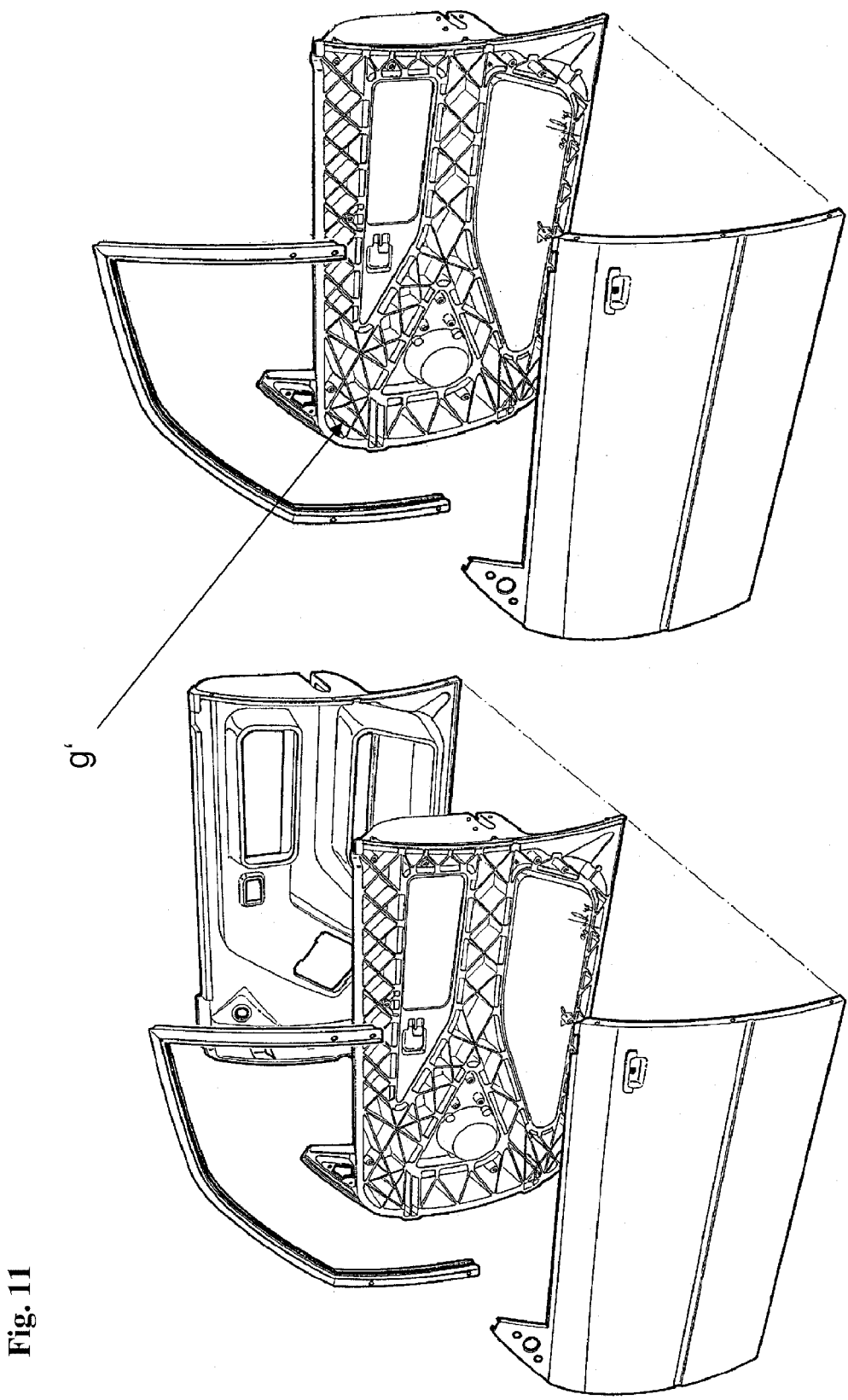
FIG. 11 shows an internal door structure (sheet-metal shell) according to the invention, with g' moulded-on rib structure and fastening points.
Figure 12:
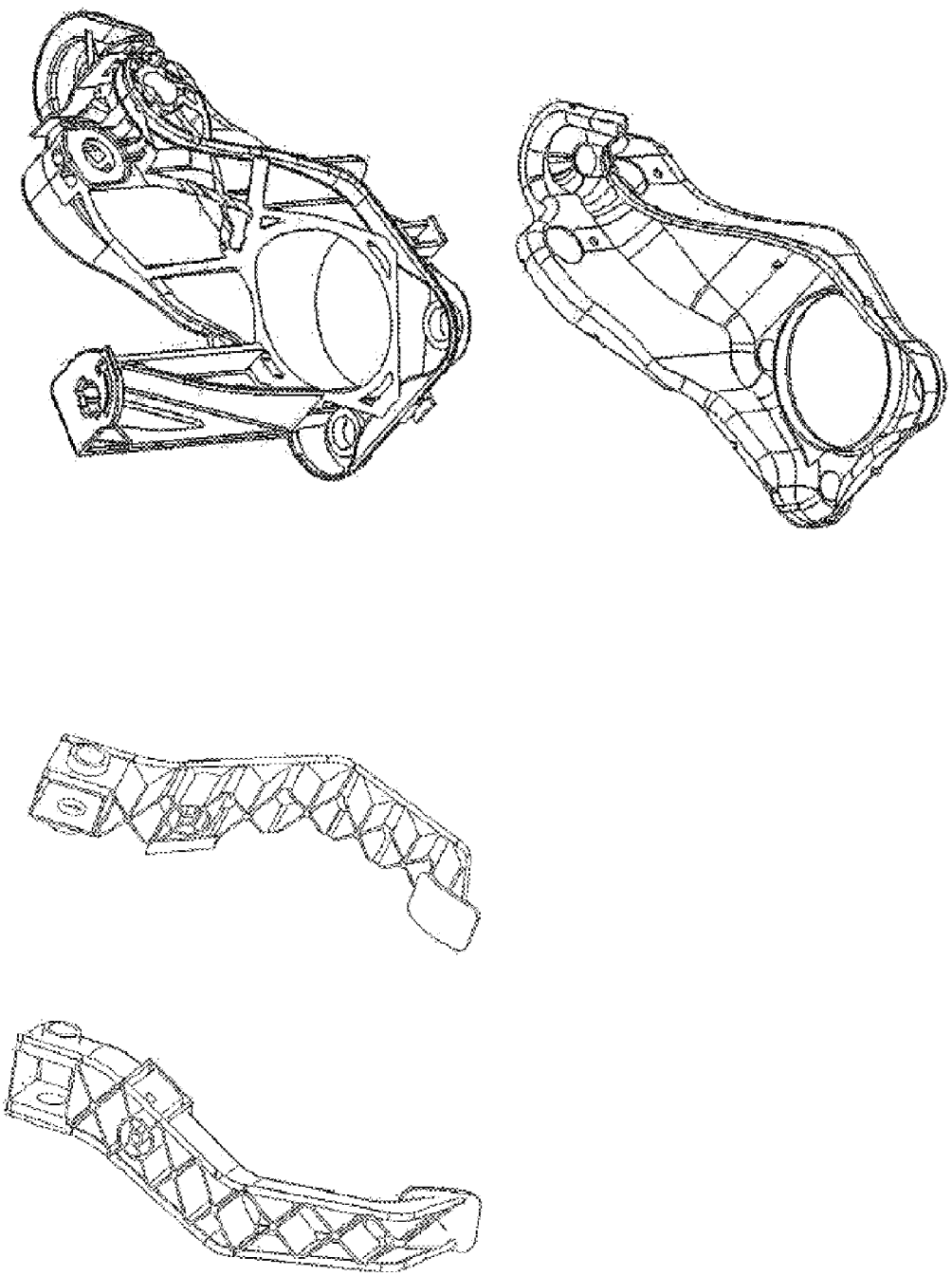
FIG. 12 shows pedal structures for a motor vehicle.
Figure 13:
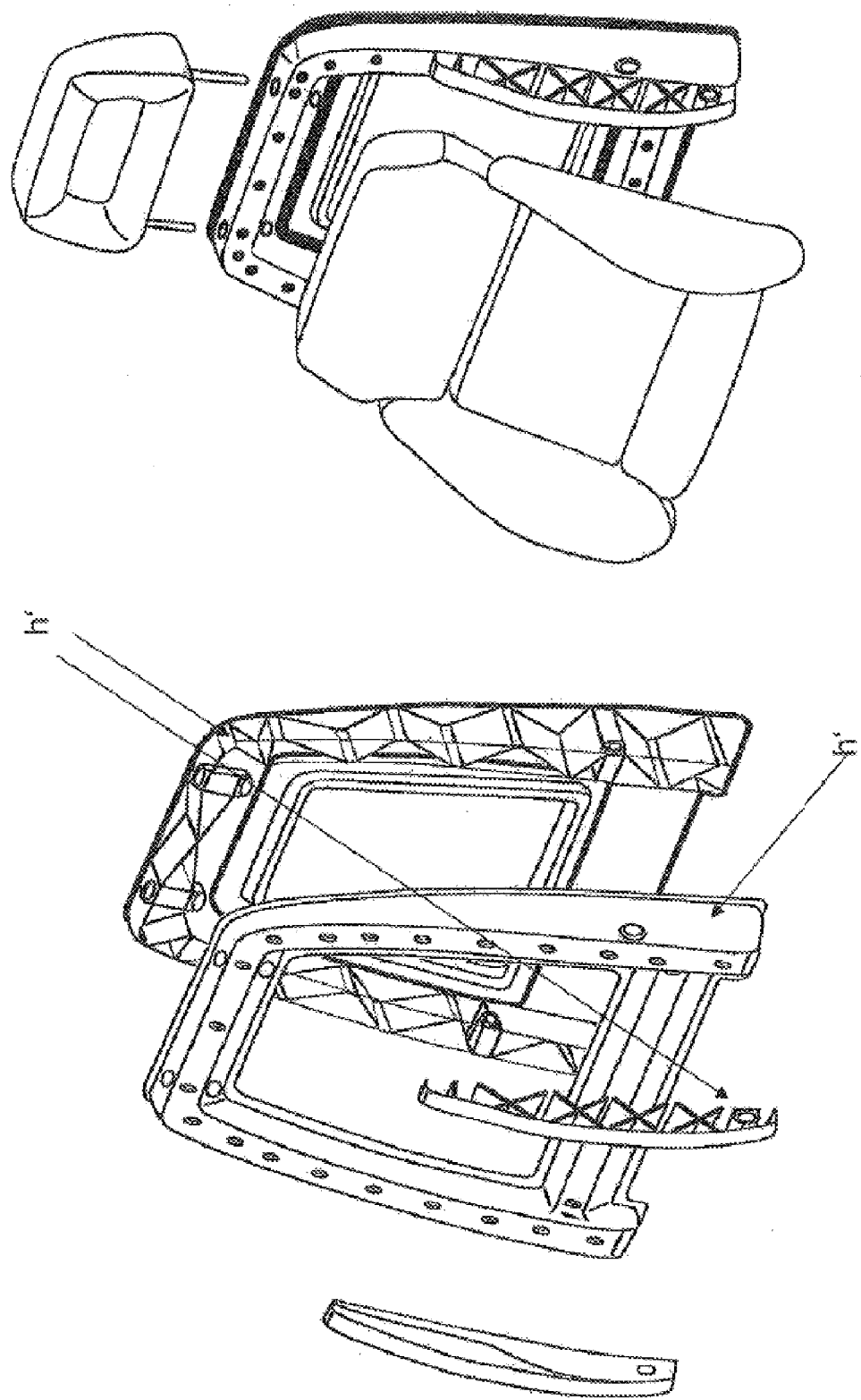

What is claimed is:

1. A lightweight component comprised of a parent body of galvanized iron and having reinforcing structures, where the reinforcing structures are securely connected to the parent body and are formed of moulded-on thermoplastic polymer compositions, wherein the thermoplastic polymer compositions comprise polyamide moulding compositions which comprise from 99.99 to 10 parts by weight of at least one aliphatic, semicrystalline, thermoplastic polyamide, and the galvanized iron is pretreated by a process selected from the group consisting of acid treatment, soda treatment, amine treatment, anodic treatment, base treatment and laser treatment.

2. A lightweight component according to claim 1, wherein the secure connection between moulded-on thermoplastic and the parent body is further achieved by way of discrete connection sites by way of perforations in the parent body, where the thermoplastic extends through these and across the area of the perforations.

3. A lightweight component according to claim 1, wherein the parent body is of shell-type shape.

4. A lightweight component according to claim 1, wherein the thermoplastic comprises polymer moulding compositions comprising nylon-6 (PA 6) or nylon-6,6 (PA 66) with relative solution viscosities of from 2.0 to 4.0 (measured in m-cresol at 25° C.) or a mixture of A) from 99.99 to 10 parts by weight of polyamide and
B) from 0.01 to 50 parts by weight of
  B1) at least one copolymer of at least one olefin with at least one methacrylate or acrylate of an aliphatic alcohol with MFI (melt flow index) of not less than 100 g/10 min, the MFI being measured or determined at 190° C. using a load of 2.16 kg, or
  B2) at least one highly branched or hyperbranched polycarbonate with an OH number of from 1 to 600 mg KOH/g of polycarbonate (to DIN 53240, Part 2), or
  B3) at least one highly branched or hyperbranched polyester of $A_xB_y$ type, where x is at least 1.1 and y is at least 2.1, or
  B4) of at least one polyalkylene glycol ester (PAGE) with low molecular weight of the formula (I)

$$R-COO-(Z-O)_n OC-R \quad (I)$$

in which
  R is a branched or straight-chain alkyl group having from 1 to 20 carbon atoms,
  Z is a branched or straight-chain $C_2$ to $C_{15}$ alkylene group, and
  n is a whole number from 2 to 20,
  or
  a mixture of B1) with B2) or of B2) with B3) or of B1) with B3) or of B1) with B2) and with B3) or of B1) with B4) or of B2) with B4) or of B3) with B4) or a ternary mixture of components B1) to B4), in each case with A).

5. A lightweight component according to claim 4, wherein the moulding compositions comprise, in addition to components A) and B), C) from 0.001 to 75 parts by weight of a filler or reinforcing material.

6. A lightweight component according to claim 5, wherein the filler or reinforcing material comprises glass fibres.

7. A lightweight component according to claim 1, wherein said moulding compositions comprise polyamides containing macromolecular chains having a star-shaped structure and containing linear macromolecular chains.

8. A lightweight component according to claim 7, wherein the polyamides are obtained by polymerizing a mixture of monomers comprising at least
  a) monomers of the formula (II) $R_1-(-A-Z)_m$,
  b) monomers of the formula (IIIa) $X-R_2-Y$ and (IIIb) $R_2-NH-C=O$
  c) monomers of the formula (IV) $Z-R_3-Z$, in which
  $R_1$ is a linear or cyclic, aromatic or aliphatic hydrocarbon radical which contains at least two carbon atoms and which can contain heteroatoms,
  A is a covalent bond or an aliphatic hydrocarbon radical having from 1 to 6 carbon atoms,
  Z is a primary amine radical or a carboxy group,
  $R_2$ and $R_3$ are identical or different aliphatic, cycloaliphatic or aromatic, substituted or unsubstituted hydrocarbon radicals which contain from 2 to 20 carbon atoms and which optionally contain heteroatoms, and
  Y is a primary amine radical, if X is a carbonyl radical, or Y is a carbonyl radical, if X is a primary amine radical, where m is a whole number from 3 to 8.

9. A process for the production of a lightweight component of hybrid design composed of a parent body which has reinforcing structures and which is composed of galvanized iron, where the reinforcing structures are securely connected to the parent body and are formed of moulded-on thermoplastic, wherein the thermoplastic comprises polymer moulding compositions of polyamide, and these comprise from 99.99 to 10 parts by weight of at least one aliphatic, semicrystalline, thermoplastic polyamide, and secure interlock connections are formed between parent body and the thermoplastic reinforcing structures by shaping processes in a shaping mould, by way of the galvanized iron surface of the parent body, the surface of which has been pretreated by a process selected from the group consisting of acid treatment, soda treatment, amine treatment, anodic treatment, base treatment and laser treatment.

10. A process according to claim 9, wherein the thermoplastic comprises polymer moulding compositions of nylon-6 (PA 6) or nylon-6,6 (PA 66) with relative solution viscosities of from 2.0 to 4.0 (measured in m-cresol at 25° C.) or a mixture of A) from 99.99 to 10 parts by weight of polyamide and
B) from 0.01 to 50 parts by weight, of:
- B1) at least one copolymer of at least one olefin with at least one methacrylate or acrylate of an aliphatic alcohol with MFI (melt flow index) of not less than 100 g/10 min, the MFI being measured or determined at 190° C. using a load of 2.16 kg, or
- B2) of at least one highly branched or hyperbranched polycarbonate with an OH number of from 1 to 600 mg KOH/g of polycarbonate (to DIN 53240, Part 2), or
- B3) of at least one highly branched or hyperbranched polyester of $A_xB_y$ type, where x is at least 1.1 and y is at least 2.1, or
- B4) of at least one polyalkylene glycol ester (PAGE) with low molecular weight of the formula (I)

$$R\text{—}COO\text{—}(Z\text{—}O)_n OC\text{—}R \qquad (I)$$

in which
  R is a branched or straight-chain alkyl group having from 1 to 20 carbon atoms,
  Z is a branched or straight-chain $C_2$ to $C_{15}$ alkylene group, and
  n is a whole number from 2 to 20,
  or
- a mixture of B1) with B2) or of B2) with B3) or of B1) with B3) or of B1) with B2) and with B3) or of B1) with B4) or of B2) with B4) or of B3) with B4) or a ternary mixture of components B1) to B4), in each case with A).

11. Motor vehicles, rail vehicles, aircraft, ships, sleds or motor scooters, comprising a lightweight component of hybrid design formed of a parent body of galvanized iron with moulded-on thermoplastic, wherein the thermoplastic is polyamide.

12. Motor vehicles, rail vehicles, aircraft, ships, sleds or motor scooters according to claim 11, wherein said thermoplastic comprises nylon-6 (PA 6) or nylon-6,6 (PA 66) with relative solution viscosities of from 2.0 to 4.0 (measured in m-cresol at 25° C.) or a mixture of A) from 99.99 to 10 parts by weight of polyamide and at least one component B) from 0.01 to 50 parts by weight of an additional flow improver selected from the group consisting of
- B1) a copolymer of at least one olefin with at least one methacrylate or acrylate of an aliphatic alcohol having from 1 to 30 carbon atoms, with MFI of not less than 100 g/10 min, the MFI (melt flow index) being measured or determined at 190° C. using a test weight of 2.16 kg, or
- B2) a highly branched or hyperbranched polycarbonate with an OH number of from 1 to 600 mg KOH/g of polycarbonate (to DIN 53240, Part 2), or
- B3) a highly branched or hyperbranched polyester of $A_xB_y$ type, where x is at least 1.1 and y is at least 2.1, or
- B4) a polyalkylene glycol ester (PAGE) with low molecular weight of the formula (I)

$$R\text{—}COO\text{—}(Z\text{—}O)_n OC\text{—}R \qquad (I)$$

in which
  R is a branched or straight-chain alkyl group having from 1 to 20 carbon atoms,
  Z is a branched or straight-chain $C_2$ to $C_{15}$ alkylene group, and
  n is a whole number from 2 to 20, or
- a mixture of B1) with B2) or of B2) with B3) or of B1) with B3) or of B1) with B2) and with B3) or of B1) with B4) or of B2) with B4) or of B3) with B4) or a ternary mixture of components B1) to B4), in each case with A), where a secure interlock connection between parent body and thermoplastic is achieved by way of the galvanized iron surface of the parent body, the surface of which has been pretreated by a process selected from the group consisting of acid treatment, soda treatment, amine treatment, anodic treatment, base treatment and laser treatment, and the said lightweight component is installed within the motor vehicles, rail vehicles, aircraft, ships, sleds or motor scooters.

\* \* \* \* \*